US012120570B2

(12) United States Patent
Eklöf et al.

(10) Patent No.: US 12,120,570 B2
(45) Date of Patent: Oct. 15, 2024

(54) CONDITIONAL MOBILITY IN A WIRELESS COMMUNICATION NETWORK

(71) Applicant: Telefonaktiebolaget LM Ericsson (publ), Stockholm (SE)

(72) Inventors: Cecilia Eklöf, Täby (SE); Icaro L. J. Da Silva, Solna (SE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 437 days.

(21) Appl. No.: 17/599,224

(22) PCT Filed: Mar. 20, 2020

(86) PCT No.: PCT/SE2020/050295
§ 371 (c)(1),
(2) Date: Sep. 28, 2021

(87) PCT Pub. No.: WO2020/197471
PCT Pub. Date: Oct. 1, 2020

(65) Prior Publication Data
US 2022/0182911 A1    Jun. 9, 2022

Related U.S. Application Data

(60) Provisional application No. 62/825,501, filed on Mar. 28, 2019.

(51) Int. Cl.
*H04W 36/24*    (2009.01)
*H04W 72/23*    (2023.01)
(52) U.S. Cl.
CPC ........... *H04W 36/24* (2013.01); *H04W 72/23* (2023.01)

(58) Field of Classification Search
CPC .......... H04W 36/36; H04W 36/00837; H04W 36/0072; H04W 36/0077; H04W 36/0085; H04W 36/08
See application file for complete search history.

(56) References Cited

U.S. PATENT DOCUMENTS

2019/0246323 A1* 8/2019 Kim .................. H04W 36/0085
2019/0387438 A1* 12/2019 Chang .................. H04W 76/27
(Continued)

FOREIGN PATENT DOCUMENTS

| WO | 2018132051 A1 | 7/2018 |
| WO | 2018175721 A1 | 9/2018 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

(Continued)

*Primary Examiner* — Ayaz R Sheikh
*Assistant Examiner* — Tarell A Hampton
(74) *Attorney, Agent, or Firm* — Murphy, Bilak & Homiller, PLLC

(57) ABSTRACT

A wireless device (16) is configured to receive, from a radio network node, a message (34) that includes a condition monitoring configuration (36) and a conditional mobility configuration (38). The condition monitoring configuration (36) configures the wireless device (16) to monitor a condition. The wireless device (16) is to apply the conditional mobility configuration (38) when the wireless device (16) detects fulfillment of the condition. The wireless device (16) is configured to process the condition monitoring configuration (36) upon receiving the message (34), and to process (Continued)

the conditional mobility configuration (38) subject to a processing precondition being met.

19 Claims, 20 Drawing Sheets

(56) References Cited

U.S. PATENT DOCUMENTS

| | | | | |
|---|---|---|---|---|
| 2019/0387440 | A1* | 12/2019 | Yiu | H04W 36/165 |
| 2020/0154326 | A1* | 5/2020 | Deenoo | H04W 36/08 |
| 2021/0168678 | A1* | 6/2021 | Deenoo | H04W 76/19 |
| 2021/0306927 | A1* | 9/2021 | Wei | H04W 36/32 |
| 2022/0046495 | A1* | 2/2022 | Lee | H04W 36/08 |
| 2022/0053388 | A1* | 2/2022 | Kim | H04W 36/0044 |
| 2022/0070752 | A1* | 3/2022 | Kim | H04W 36/32 |
| 2023/0080714 | A1* | 3/2023 | Pelletier | H04W 74/0833 370/254 |
| 2024/0015626 | A1* | 1/2024 | Chang | H04W 76/27 |

OTHER PUBLICATIONS

3GPP, "3GPP TS 38.133 V15.5.0", 3rd Generation Partnership Project; Technical Specification Group Radio Access Network; NR; Requirements for support of radio resource management (Release 15), Mar. 2019, 1-892.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, 1-770.

Ericsson, "Configuration of Conditional handover in NR", 3GPP TSG RAN WG2 #107, R2-1909330, Prague, Czech Republic, Aug. 26-30, 2019, 1-12.

Interdigital Inc., "Details of Conditional Handover Procedure for NR", 3GPP TSG-RAN WG2 Meeting #105, R2-1901584, Athens, Greece, Feb. 25-Mar. 1, 2019, 1-4.

Mediatek Inc., "Compliance Check for CHO Target Cell Configurations", 3GPP TSG-RAN WG2 Meeting #108, R2-1914888, Reno, NV, USA, Nov. 18-22, 2019, 1-4.

* cited by examiner

CONDITIONAL MOBILITY IN A WIRELESS COMMUNICATION NETWORK

TECHNICAL FIELD

The present application relates generally to a wireless communication network, and relates more particularly to conditional mobility in such a network.

BACKGROUND

Robustness of mobility procedures to failure proves challenging particularly in New Radio (NR) systems whose radio links are more prone to fast fading due to their higher operating frequencies. Conditional mobility is one approach to improve mobility robustness in this regard. Under this approach, a wireless device may be commanded to perform a mobility procedure (e.g., handover or resume) earlier than traditionally commanded, before the source radio link quality deteriorates below a certain threshold. But the wireless device is commanded to wait to perform that mobility procedure until the wireless device detects that a certain condition is fulfilled, e.g., the source radio link quality deteriorates even further below a different threshold. Once the device detects that condition, the device may autonomously perform the mobility procedure without receiving any other signaling on the source radio link, so that the procedure proves robust to source link deterioration.

This conditional mobility approach can improve mobility robustness even more if multiple targets are prepared in advance, e.g., so that multiple target options exist in the face of deteriorating source conditions. Preparing multiple targets however requires transmitting multiple conditional mobility configurations to the wireless device and therefore threatens the device's ability to process those configurations in an efficient and/or timely manner. This may in turn jeopardize the ability of the conditional mobility approach to avoid mobility failure and/or poor service performance.

SUMMARY

According to some embodiments herein, a wireless device is configured to process a message that includes multiple conditional mobility configurations within a maximum allowed delay that is a function of the number of the conditional mobility configurations. The maximum allowed delay may for instance linearly increase with the number of conditional mobility configurations. The device in this and other cases may be given enough time to process the whole message (i.e., all the configurations) before having to be prepared to receive an uplink grant for transmitting a response to the message. Correspondingly, a radio network node may transmit such an uplink grant to the wireless device only after the maximum allowed delay, i.e., so as to give the wireless device enough time to process the message.

In other embodiments, a wireless device receives a message that includes both a condition monitoring configuration which configures the wireless device to monitor a condition and a conditional mobility configuration which the wireless device is to apply when the wireless device detects fulfillment of the condition. The wireless device in these embodiments may be configured to process the condition monitoring configuration (e.g., immediately) upon receiving the message, but process the conditional mobility configuration only if and when a processing precondition is met. The processing precondition may for instance be met when the condition is fulfilled, when a time-to-trigger associated with the conditional mobility configuration starts, when a mobility procedure associated with the conditional mobility configuration is triggered or executed, when the wireless device monitors, or begins to monitor, for fulfillment of the condition, or the like. In these and other instances, then, the conditional mobility configuration may or may not have to be processed. And, if it is processed, the processing may be delayed so as to not jeopardize the ability of the wireless device to comply with a maximum allowed delay for processing and/or for being ready to receive an uplink grant.

More particularly, embodiments herein include a method performed by a wireless device. The method comprises receiving, from a radio network node, a message that includes a condition monitoring configuration and a conditional mobility configuration. The condition monitoring configuration configures the wireless device to monitor a condition. The wireless device is to apply the conditional mobility configuration when the wireless device detects fulfillment of the condition. The method comprises processing the condition monitoring configuration upon receiving the message. The method also comprises processing the conditional mobility configuration subject to a processing precondition being met.

In some embodiments, the wireless device is configured to process the message within a maximum allowed delay. In this case, processing of the conditional mobility configuration is subjected to the processing precondition being met in order for the wireless device to comply with the maximum allowed delay for processing the message. In one such embodiment, the maximum allowed delay is independent of a number of conditional mobility configurations included in the message.

In some embodiments, processing the conditional mobility configuration comprises processing the conditional mobility configuration only if and when the processing precondition is met.

In some embodiments, the processing precondition is met when the condition is fulfilled or when a mobility procedure associated with the conditional mobility configuration is triggered or executed.

In some embodiments, the processing precondition is met: when a time-to-trigger associated with the conditional mobility configuration starts; when the wireless device monitors, or begins to monitor, for fulfillment of the condition; or when the wireless device transmits a response to the message.

In some embodiments, the method further comprises receiving an uplink grant from the radio network node, and transmitting, to the radio network node and based on the uplink grant, a response to the message. In one such embodiment, the processing precondition is met after, but not responsive to, transmitting the response.

In some embodiments, processing the conditional mobility configuration includes determining whether the wireless device is able to comply with the conditional mobility configuration.

In some embodiments, the message includes multiple conditional mobility configurations. In one such embodiment, the method comprises processing each of the conditional mobility configurations only if and when a respective processing precondition for that conditional mobility configuration is met.

Embodiments herein also include a corresponding wireless device. The wireless device is configured (e.g., via communication circuitry and processing circuitry) to receive, from a radio network node, a message that includes a condition monitoring configuration and a conditional mobility configuration. The condition monitoring configuration configures the wireless device to monitor a condition. The wireless device is to apply the conditional mobility configuration when the wireless device detects fulfillment of the condition. The wireless device is further configured to process the condition monitoring configuration upon receiving the message. The wireless device is also configured to process the conditional mobility configuration subject to a processing precondition being met.

Embodiments moreover include a corresponding computer program and carrier of that computer program, such as a non-transitory computer-readable medium.

DETAILED DESCRIPTION

Figure 1:
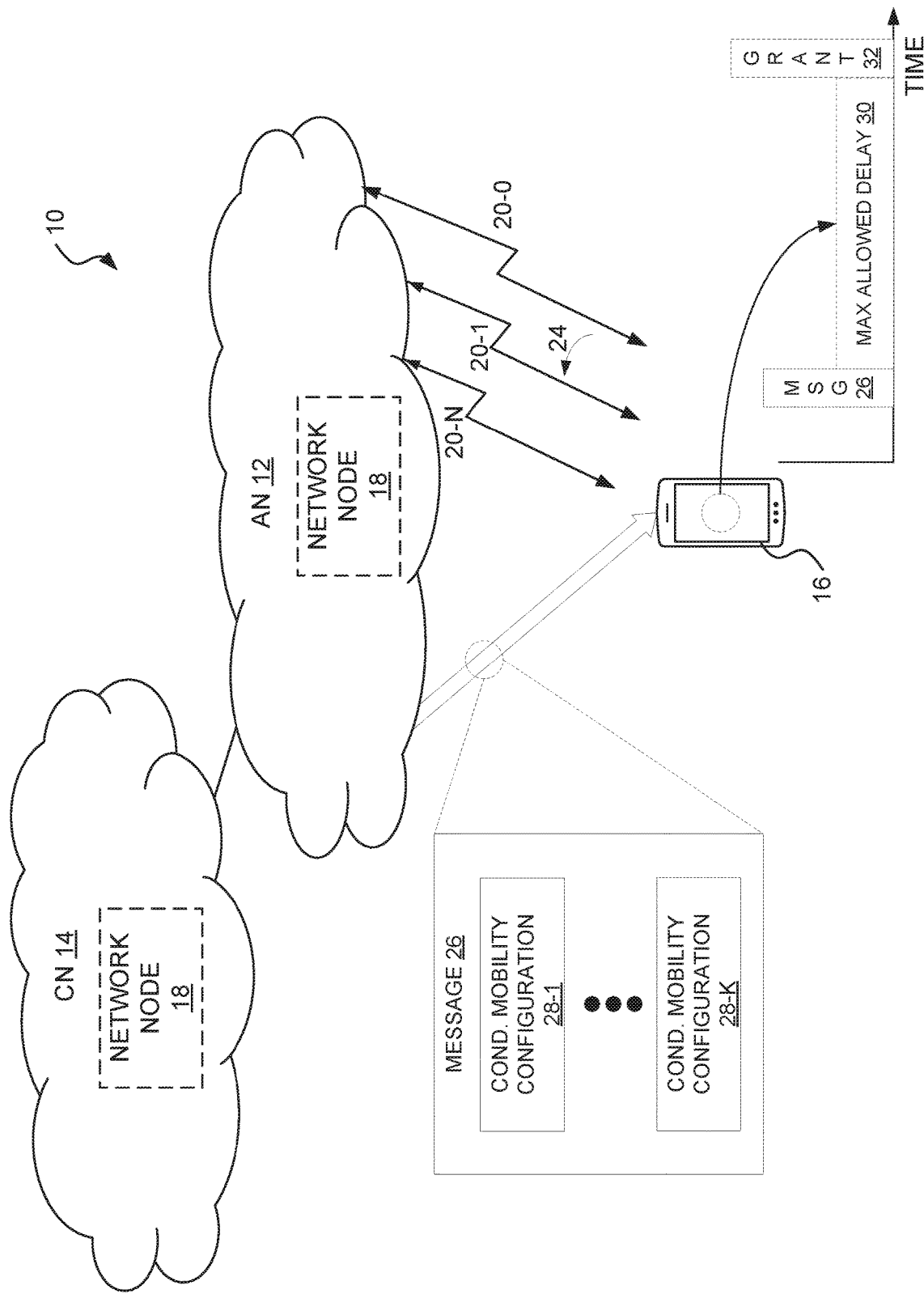
FIG. 1 is a block diagram of a wireless communication network according to some embodiments.

FIG. 1 illustrates a wireless communication network 10 according to one or more embodiments. As shown, the network 10, e.g., a 5G network or New Radio, NR, network, may include an access network (AN) 12 and a core network (CN) 14. The AN 12 wirelessly connects a wireless communication device 16 (or simply "wireless device 16") to the CN 14. The CN 14 in turn connects the wireless device 16 to one or more external networks (not shown), such as a public switched telephone network and/or a packet data network, e.g., the Internet.

The AN 12 provides links via which the wireless device 16 may wirelessly access the system 10, e.g., using uplink and/or downlink communications. The AN 12 may for example provide links 20-0, 20-1, . . . 20-N (generally links 20) in the form of access nodes, e.g., base stations, cells, sectors, beams, carriers, or the like. Some links 20 may provide wireless coverage over different geographical areas.

The network 10, e.g., via one or more network nodes 18 in the AN 12 and/or CN 14, may control configuration of the wireless device 16 in a number of respects. That is, the network 10 may control application by the wireless device 16 of different possible types of configurations. For example, the network 10 may control the device's configuration in terms of which link 20 the device 16 uses to access the network 10, e.g., in or for a so-called connected mode, which may for instance be a mode in which the device 16 has established a radio resource control, RRC, connection with the network 10, in contrast with an RRC idle mode in which no RRC connection is established. The network 10 in this regard may transmit to the wireless device 16 a type of configuration (e.g., a mobility configuration) that, when applied by the wireless device 16, configures the device 16 to use certain link(s) 20 to access the network 10. In some embodiments, a mobility configuration may for example configure the device 16 to perform a mobility procedure that causes the device 16 to switch 24 from accessing the network 10 via one link to accessing the system via another link, e.g., in connected mode. In some embodiments, this link switch 24 may be a handover. In another respect, the network 10 may control the device's configuration in terms of how many links the device 16 uses to access the network 10, e.g., in the context of dual connectivity, carrier aggregation, or the like. For example, the network 10 may signal a different type of configuration to the device 16 for adding a secondary cell group (SCG) or a secondary cell. In still other embodiments, the network 10 may signal another type of configuration to the device 16 for resuming a connection, e.g., an RRC connection resume, for a reconfiguration with sync, for a reconfiguration, for a reestablishment, or the like. In yet other respects, the network 10 may signal a different type of configuration that configures the wireless device 16 to perform a measurement, or still another type of configuration that configures the wireless device 16 to record/log certain information.

According to embodiments herein, the network 10 may transmit a mobility configuration to the wireless device 16 but indicate that the wireless device 16 is to only conditionally apply that configuration. In this sense, then, the network 10 transmits to the wireless device 16 a so-called conditional mobility configuration that is a configuration that the wireless device 16 is to conditionally apply. In this case, the wireless device 16 is commanded to wait to apply the configuration until the wireless device detects that a condition is fulfilled, e.g., the source radio link quality deteriorates even further below a different threshold. Once the device detects the condition, the device 16 may autonomously apply the configuration without receiving any other signaling.

In some embodiments, the network 10 may transmit multiple conditional mobility configurations to the wireless device 16, e.g., as different options so that the wireless device 16 applies whichever of the configurations whose application is conditional on a fulfilled condition. The network node 18 in these embodiments shown in FIG. 1 may transmit to the wireless device 16 a message 26, e.g., in the form of an RRC message such as an RRC reconfiguration message or an RRC conditional reconfiguration message. The message 26 may include multiple conditional mobility configurations 28-1 . . . 28-K, where K>1. Each conditional mobility configuration may be a mobility configuration that the wireless device 16 is to apply when the wireless device detects fulfillment of a respective condition (which may also be indicated by the message 26).

The wireless device 16 in some embodiments is configured to process the message 26, e.g., upon receiving all or at least a part of the message 26. Processing of the message 26 in this regard means evaluating the content of the message 26, applying a configuration included in the message, or both. This processing may include for instance, for each of the conditional mobility configurations 28-1 . . . 28-K, determining whether the wireless device 16 is able to comply with the conditional mobility configuration. This may involve for instance checking if the wireless device is able to support a random access configuration, security parameters, or other parameters indicated by the conditional mobility configuration. In one or more embodiments, the wireless device 16 processes all of the message 26, e.g., by performing this check for all of the conditional mobility configurations.

Regardless of the particular type of processing, though, the wireless device 16 according to some embodiments is configured to process the message 26 within a maximum allowed delay 30. This maximum allowed delay 30 may for instance be expressed as a time from an end of reception of the message 26 at a physical layer of the wireless device 16 to when the wireless device 16 shall be ready for reception of an uplink grant for a response message that the wireless device 16 is to transmit in response to the message 26. In any event, the maximum allowed delay 30 in some embodiments is a function of a number K of the conditional mobility configurations 28-1, . . . 28-K. For instance, according to this function in some embodiments, the maximum allowed delay 30 in some embodiments increases (e.g., linearly) as the number K of the conditional mobility configuration increases. As one example, the maximum allowed delay 30 may be equal to $A*K$, where A is an integer number of time units (e.g., milliseconds). Or, the maximum allowed delay 30 may be equal to $A*K+B$, where B is also an integer number of time units. In still another example, the maximum allowed delay 30 may be equal to $A*(K-1)+B$.

In some embodiments, providing the maximum allowed delay 30 as a function of the number K of the conditional mobility configurations 28-1, . . . 28-K may advantageously allow the wireless device 16 enough time to process the message 26 and still be ready for an uplink grant from the network 10. In some embodiments, for instance, after the maximum allowed delay 30 has passed since receiving the message 26, the network node 18 may transmit and the wireless device 16 may receive such an uplink grant 32. The wireless device 16 may then transmit a response to the message 26 based on the uplink grant 32. The response may for example acknowledge the message 26, indicate whether the wireless device 16 is able to comply with all or some of the conditional mobility configurations 28-1 . . . 28-K, and/or indicate whether the wireless device 16 succeeded or failed in complying with or applying all or some of the conditional mobility configurations 28-1 . . . 28-K. In some embodiments, the response may indicate the above on a configuration by configuration basis, e.g., indicate that the wireless device 16 is not able to comply with one or more particular ones of the conditional mobility configurations 28-1, . . . 28-K. In some embodiments, if the wireless device 16 is unable to comply with at least one of the conditional mobility configurations 28-1 . . . 28-K, the wireless device 16 may initiate a connection re-establishment procedure or connection release procedure.

Although the maximum allowed delay 30 was expressed above as a function of the number K of the conditional mobility configurations 28-1, . . . 28-K, the maximum allowed delay 30 may be expressed in other ways in other embodiments. For example, in some embodiments, the message 26 includes, for each of multiple targets (e.g., target cells, target frequencies, etc.), a conditional mobility configuration. In one or more embodiments, the number K of conditional mobility configurations is the same as the number of targets. In this case, the maximum allowed delay 30 may be equivalently expressed as a function of the number of conditional mobility configurations or the number of targets. In other embodiments, there may be multiple conditional mobility configurations for the same target. In this case, the maximum allowed delay 30 may be expressed either as a function of the number of conditional mobility configurations or the number of targets, depending on the desired result.

Figure 2:
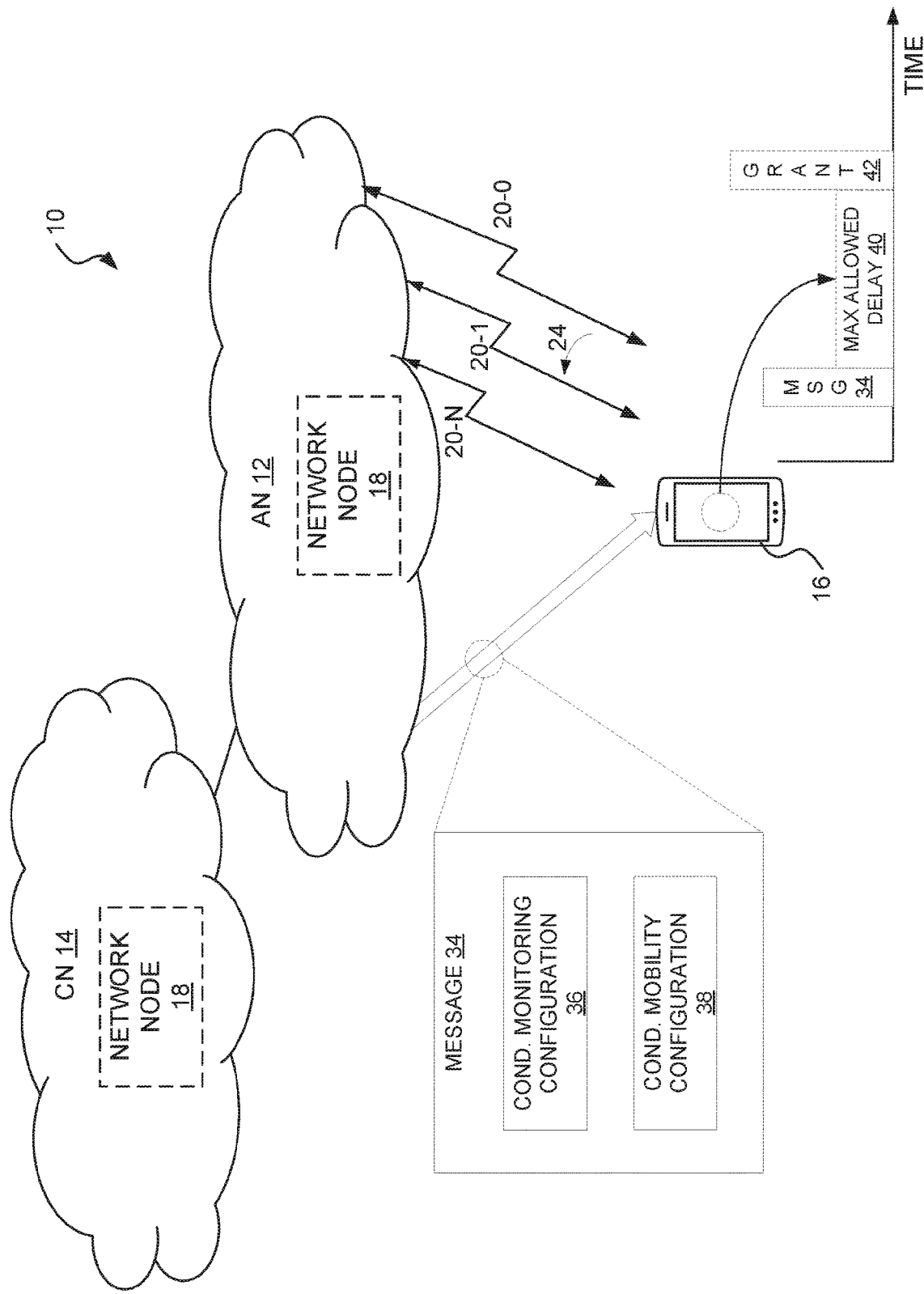
FIG. 2 is a block diagram of a wireless communication network according to other embodiments.

FIG. 2 illustrates still other embodiments herein, where the wireless communication network 10 is as described in FIG. 1 except for the differences noted below. As shown, the wireless device 16 may receive a message 34 that includes a condition monitoring configuration 36 and a conditional mobility configuration 38. The condition monitoring configuration 36 configures the wireless device 16 to monitor a condition. The wireless device 16 is to apply the conditional mobility configuration 38 when the wireless device 16 detects fulfillment of this condition.

The wireless device 16 is configured to process the condition monitoring configuration 36 (immediately) upon receiving the message 34. Such processing may for instance involve checking whether the wireless device 16 is able to comply with the condition monitoring configuration 36. By contrast, the wireless device 16 in some embodiments is configured to process the conditional mobility configuration 38 later (e.g., in a delayed manner compared to the condition monitoring configuration 36) and/or subject to a certain precondition being met. Processing of the conditional mobility configuration 38 may similarly involve checking whether the wireless device 16 is able to comply with the conditional mobility configuration 36. The wireless device 16 may delay and/or precondition this and other types of processing of the conditional mobility configuration 38 in this way in order to avoid jeopardizing its ability to comply with a maximum allowed delay 40, i.e., a delay between when the wireless device 16 receives the message 34 and when the wireless device 16 must be ready to receive an uplink grant 42 for a response to the message 34.

In fact, in some embodiments, this maximum allowed delay 40 has a value that is independent of the number of conditional monitoring configurations included in the message 34. In these and other embodiments, then, the message 34 may even have multiple conditional mobility configurations 38, in which case the wireless device may delay and/or precondition processing of one or more of those conditional mobility configurations 38. Doing so may enable the wireless device 16 to comply with the maximum allowed delay 40 no matter how many conditional mobility configurations 38 are included in the message 34. The wireless device 16 in some embodiments may for example simply store in memory whatever conditional mobility configurations 38 are included in the message 34, for later processing if and when the processing precondition is met.

In some embodiments in this regard, the response that the wireless device 16 transmits after the maximum allowed delay 40 may just indicate whether the wireless device 16 is able to comply with all or some of the condition monitoring configuration(s) 36 included in the message 34 (as determined by the wireless device's processing of the condition monitoring configuration(s) 36). The response may not indicate whether the wireless device 16 is able to comply with all or some of the conditional mobility configuration(s) 38 included in the message 34, since by the time the response is transmitted the wireless device 16 may not have processed the conditional mobility configuration(s) 38 in order to check for such compliance. Instead, the wireless device 16 may transmit another response later, once the wireless device 16 has processed at least one of the conditional mobility configuration(s) 38 such as by checking for compliance with that at least one conditional mobility configuration. In some embodiments, if the wireless device 16 is unable to comply with at least one of the conditional mobility configurations 28-1 . . . 28-K, as determined by the wireless device's deferred compliance check, the wireless device 16 may only then initiate a connection re-establishment procedure or connection release procedure.

In any event, where the wireless device 16 processes a conditional mobility configuration 38 only if and when a "processing" precondition is met, the precondition may be met for instance when the condition for applying the conditional mobility configuration 38 is fulfilled. This way, the wireless device 16 may avoid having to process the conditional mobility configuration 38 if the configuration 38 never ends up needing to be applied or at the least postpones having to process the configuration 38 until it needs to be applied. In other embodiments, the precondition may be met when a time-to-trigger associated with the conditional mobility configuration 38 starts, when a mobility procedure associated with the conditional mobility configuration 38 is triggered or executed, when the wireless device 16 monitors, or begins to monitor, for fulfillment of the condition for applying the configuration 38, or the like.

In any of these embodiments, then, the wireless device 16 in some cases may start processing a conditional mobility configuration included in the message 34 only after (but not responsive to) receiving the uplink grant 42 and/or only after transmitting a response to the message 34.

Figure 3:
FIG. 3A is a logic flow diagram of a method performed by a wireless device according to some embodiments.
FIG. 3B is a logic flow diagram of a method performed by a radio network node according to some embodiments.

In view of the modifications and variations herein, FIG. 3A depicts a method performed by a wireless device 16 in accordance with particular embodiments, e.g., for conditional mobility in a wireless communication network 10. As shown, the method includes receiving, from a radio network node, a message 26 that includes multiple conditional mobility configurations 28-1 . . . 28-K (Block 300). The method in some embodiments further includes processing the message 26 within a maximum allowed delay 30 that is a function of a number K of the conditional mobility configurations 28-1 . . . 28-K (Block 310).

The method in one or more embodiments further comprises, after the maximum allowed delay 30 has passed since reception of the message 26, receiving an uplink grant 32 from the radio network node (Block 320). The method in this case may then comprise transmitting, to the radio network node, a response message based on the uplink grant 32 (Block 330).

FIG. 3B depicts a method performed by a radio network node in accordance with other particular embodiments, e.g., for facilitating conditional mobility in a wireless communication network 10. The method may comprise transmitting, from the radio network node to a wireless device 16, a message 26 that includes multiple conditional mobility configurations 28-1 . . . 28-K (Block 350). The method in some embodiments may also include, after a maximum allowed delay 30 that is a function of a number K of the conditional mobility configurations 28-1 . . . 28-K, transmitting from the radio network node to the wireless device 16 an uplink grant 32 for a response to be transmitted by the wireless device 16 as a response to the message 26 (Block 360). In some embodiments, the method further comprises receiving the response from the wireless device 16 (Block 370).

Figure 4:
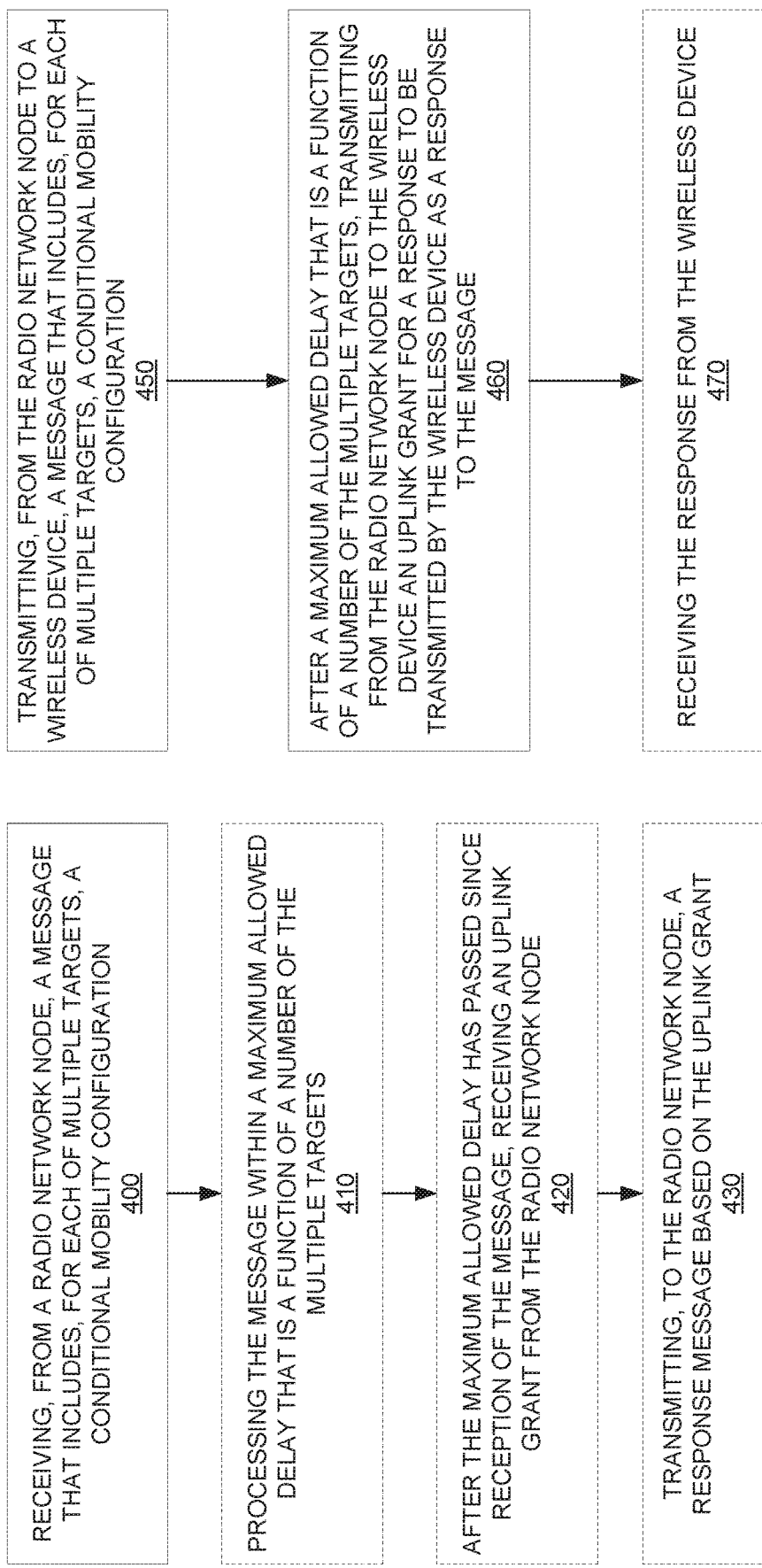
FIG. 4A is a logic flow diagram of a method performed by a wireless device according to other embodiments.
FIG. 4B is a logic flow diagram of a method performed by a radio network node according to other embodiments.

FIG. 4A depicts a method performed by a wireless device 16 in accordance with particular embodiments, e.g., for conditional mobility in a wireless communication network 10. The method as shown includes receiving, from a radio network node, a message 26 that includes, for each of multiple targets, a conditional mobility configuration (Block 400). The method may further comprise processing the message 26 within a maximum allowed delay 30 that is a function of a number of the multiple targets (Block 410).

In some embodiments, the method also comprises, after the maximum allowed delay 30 has passed since reception of the message 26, receiving an uplink grant 32 from the radio network node (Block 420). The method may then comprise transmitting, to the radio network node, a response message based on the uplink grant 32 (Block 430).

FIG. 4B depicts a method performed by a radio network node in accordance with other particular embodiments, e.g., for facilitating conditional mobility in a wireless communication network 10. The method may comprise transmitting, from the radio network node to a wireless device 16, a message 26 that includes, for each of multiple targets, a conditional mobility configuration (Block 450). The method may also comprise, after a maximum allowed delay 30 that is a function of a number of the multiple targets, transmitting from the radio network node to the wireless device 16 an uplink grant 32 for a response to be transmitted by the wireless device 16 as a response to the message 26 (Block 460). In some embodiments, the method further comprises receiving the response from the wireless device 16 (Block 470).

Figure 5:
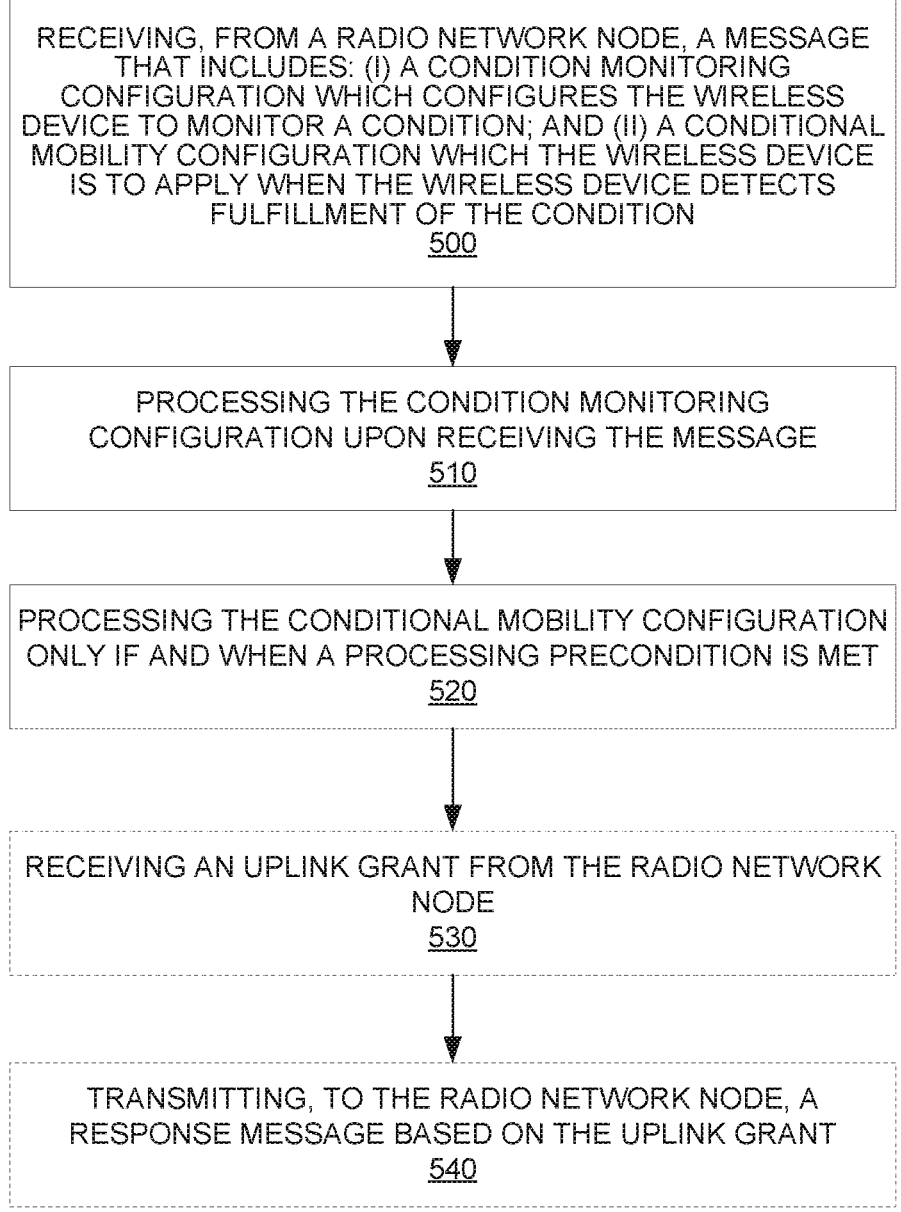
FIG. 5 is a logic flow diagram of a method performed by a wireless device according to still other embodiments.

FIG. 5 depicts a method performed by a wireless device 16 in accordance with particular embodiments, e.g., for conditional mobility in a wireless communication network 10. The method as shown includes receiving, from a radio network node, a message 34 that includes: (i) a condition monitoring configuration 36 which configures the wireless device 16 to monitor a condition; and (ii) a conditional mobility configuration 38 which the wireless device 16 is to apply when the wireless device 16 detects fulfillment of the condition (Block 500). The method further comprises processing the condition monitoring configuration 36 upon receiving the message 34 (Block 510). The method may also comprise processing the conditional mobility configuration 38 only if and when a processing precondition is met (Block 520).

In some embodiments, the processing precondition is met when the condition for applying the conditional mobility configuration 38 is fulfilled. In other embodiments, the processing precondition may be met when a time-to-trigger associated with the conditional mobility configuration 38 starts, when a mobility procedure associated with the conditional mobility configuration 38 is triggered or executed, when the wireless device 16 monitors, or begins to monitor, for fulfillment of the condition for applying the configuration 38, or the like.

In some embodiments, the method further comprises receiving an uplink grant 42 from the radio network node (Block 530). The method may then include transmitting, to the radio network node and based on the uplink grant 42, a response to the message 34 (Block 540).

Note that each step in dotted lines in the above figures is optional.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
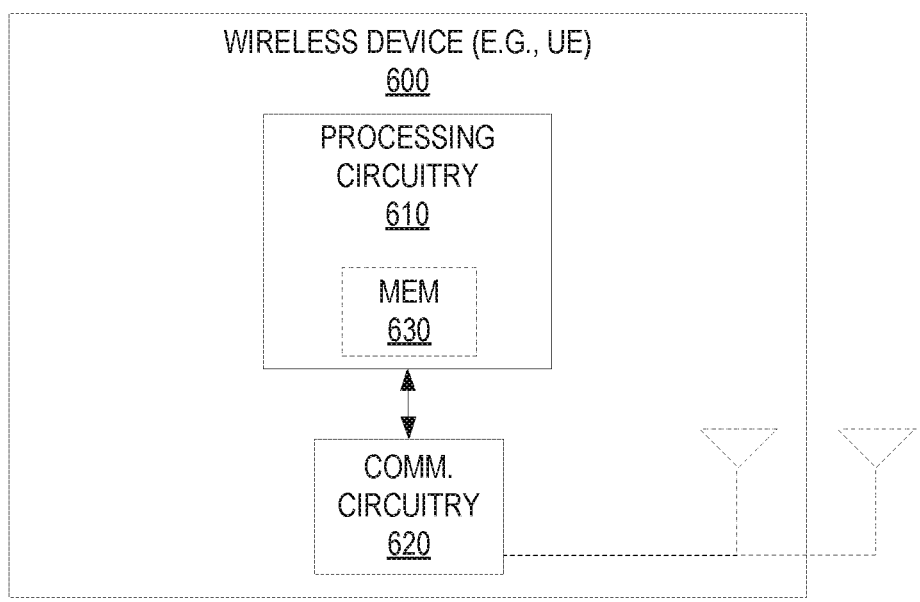
FIG. 6 is a block diagram of a wireless device according to some embodiments.

FIG. 6 for example illustrates a wireless device 600 (e.g., wireless device 16) as implemented in accordance with one or more embodiments. As shown, the wireless device 600 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the wireless device 600. The processing circuitry 610 is configured to perform processing described above, e.g., in FIG. 3A, FIG. 4A, or FIG. 5, such as by executing instructions stored in memory 630. The processing circuitry 610 in this regard may implement certain functional means, units, or modules.

Figure 7:
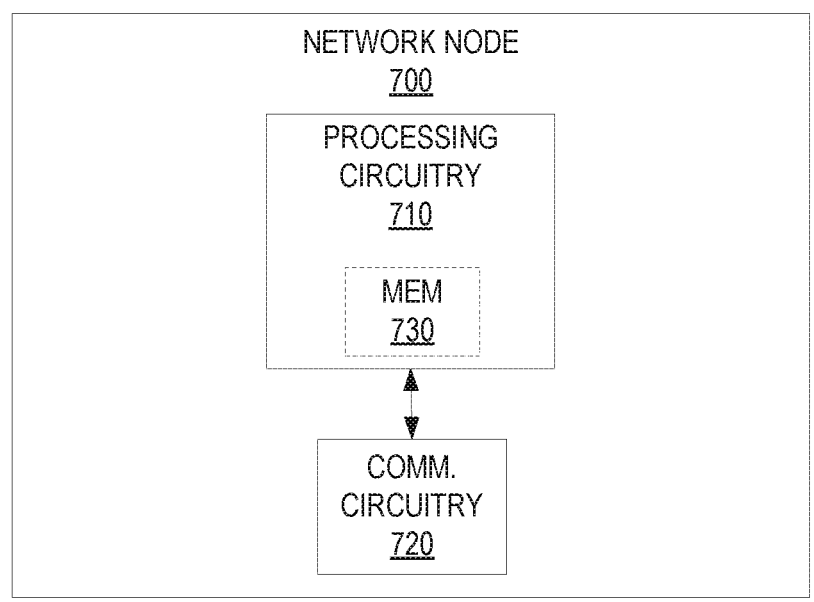
FIG. 7 is a block diagram of a radio network node according to some embodiments.

FIG. 7 illustrates a network node 700 (e.g., network node 18) as implemented in accordance with one or more embodiments. As shown, the network node 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, e.g., in FIG. 3B or FIG. 4B, such as by executing instructions stored in memory 730. The processing circuitry 710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

An RRC_CONNECTED user equipment (UE) in Long Term Evolution (LTE) (also called EUTRA) can be configured by the network to perform measurements and, upon triggering measurement reports the network may send a handover command to the UE (in LTE an RRConnectionReconfiguration with a field called mobilityControlInfo and in New Radio (NR) an RRCReconfiguration with a reconfigurationWithSync field).

These reconfigurations are actually prepared by the target cell upon a request from the source node (over X2 interface in case of EUTRA-EPC or Xn interface in case of EUTRA-5GC or NR) and takes into account the existing RRC configuration the UE has with source cell (which are provided in the inter-node request). Among other parameters, that reconfiguration provided by the target cell contains all of the information the UE needs to access the target cell, e.g., random access configuration, a new Cell Radio Network Temporary Identity (C-RNTI) assigned by the target cell and security parameters enabling the UE to calculate new security keys associated to the target cell so the UE can send a handover complete message on Signaling Radio Bearer #1 (SRB1) (encrypted and integrity protected) based on new security keys upon accessing the target cell.

Figure 8A:
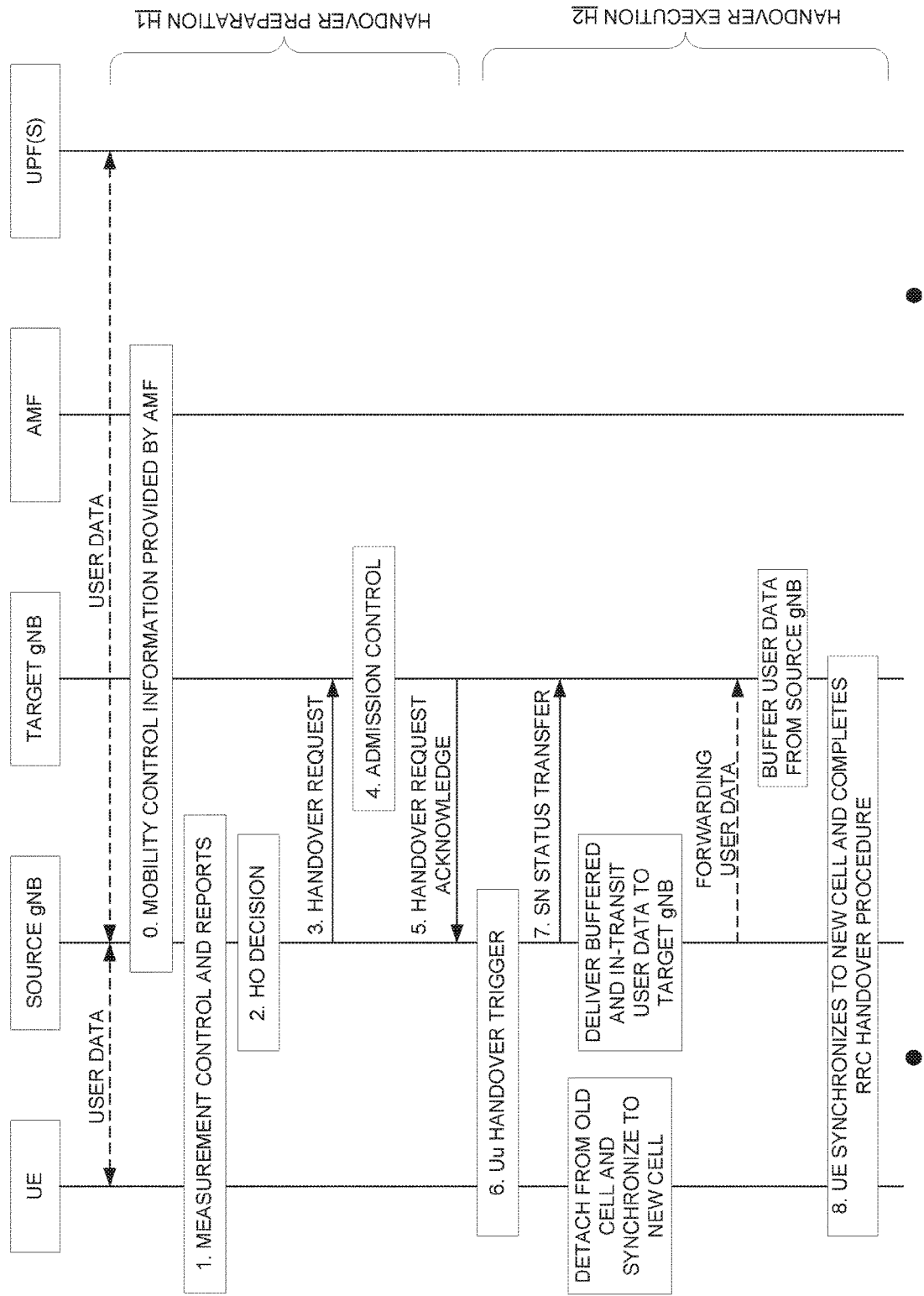
FIG. 8A and FIG. 8B are call flow diagrams of a handover procedure according to some embodiments.
Figure 8B:
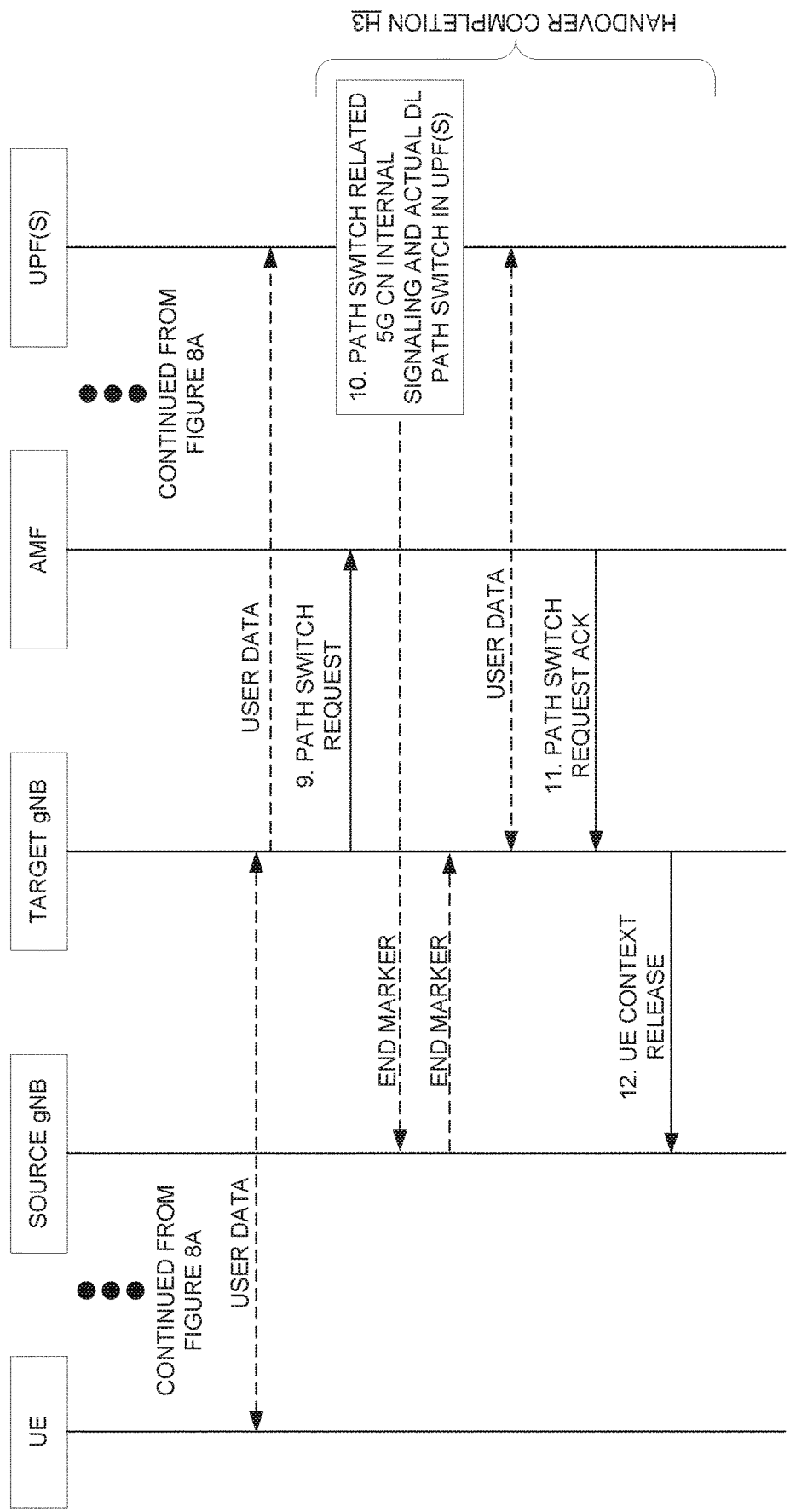

FIGS. 8A and 8B summarize the flow signalling between UE, source node and target node during a handover procedure.

As shown, the UE may be transmitting user data to and/or receiving user data from User Plane Function(s) via a source gNB. Handover preparation H1, handover execution H2, and handover completion H3 may thereafter proceed as follows.

Step 0. The UE context within the source gNB contains information regarding roaming and access restrictions which were provided either at connection establishment or at the last timing advance (TA) update.

Step 1. The source gNB configures the UE measurement procedures and the UE reports according to the measurement configuration.

Step 2. The source gNB decides to handover the UE, based on MeasurementReport and Radio Resource Management (RRM) information.

Step 3. The source gNB issues a Handover Request message to the target gNB passing a transparent RRC container with necessary information to prepare the handover at the target side. The information includes at least the target cell ID, KgNB*, the Cell Radio Network Temporary Identity (C-RNTI) of the UE in the source gNB, RRM-configuration including UE inactive time, basic AS-configuration including antenna Info and DL Carrier Frequency, the current QoS flow to Data Radio Bearer (DRB) mapping rules applied to the UE, the System Information Block #1 (SIB1) from source gNB, the UE capabilities for different Radio Access Technologies (RATs), Protocol Data Unit (PDU) session related information, and can include the UE reported measurement information including beam-related information if available. The PDU session related information includes the slice information (if supported) and QoS flow level QoS profile(s). NOTE: After issuing a Handover Request, the source gNB should not reconfigure the UE, including performing Reflective QoS flow to DRB mapping.

Step 4. Admission Control may be performed by the target gNB. Slice-aware admission control shall be performed if the slice information is sent to the target gNB. If the PDU sessions are associated with non-supported slices the target gNB shall reject such PDU Sessions.

Step 5. The target gNB prepares the handover with L1/L2 and sends the HANDOVER REQUEST ACKNOWLEDGE to the source gNB, which includes a transparent container to be sent to the UE as an RRC message to perform the handover.

Step 6. The source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated Random Access Channel (RACH) resources, the association between RACH resources and Synchronization Signal Block(s) (SSB(s)), the association between RACH resources and UE-specific Channel State Information Reference Signal (CSI-RS) configuration(s), common RACH resources, and system information of the target cell, etc.

Step 7. The source gNB sends the SN STATUS TRANSFER message to the target gNB.

The UE may then detach from the old cell and synchronize to the new cell. The source gNB may deliver buffered and in-transit user data to the target gNB, by forwarding that user data to the target gNB. The target gNB may buffer this user data from the source gNB.

Step 8. The UE synchronises to the target cell and completes the RRC handover procedure by sending RRCReconfigurationComplete message to target gNB.

At this point, the UE may transmit user data to and/or receive user data from the target gNB, but the target gNB may only transmit user data to the UPF(s). In order for the target gNB to be able to receive user data from the UPF(s) for the UE, the target gNB proceeds as follows.

Step 9. The target gNB sends a PATH SWITCH REQUEST message to Access and Mobility Function (AMF) to trigger 5G Core (5GC) to switch the downlink (DL) data path towards the target gNB and to establish an NG-C interface instance towards the target gNB.

Step 10. 5GC switches the DL data path towards the target gNB. The User Plane Function (UPF) sends one or more "end marker" packets on the old path to the source gNB per PDU session/tunnel and then can release any U-plane/TNL resources towards the source gNB. The source gNB may similarly send one or more "end marker" packets to the target gNB.

At this point, the target gNB may transmit user data to and receive user data from the UPF(s) for the UE.

Step 11. The AMF confirms the PATH SWITCH REQUEST message with the PATH SWITCH REQUEST ACKNOWLEDGE message.

Step 12. Upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

Both in LTE and NR, some principles exist for handovers (or in more general terms, mobility in RRC_CONNECTED). Mobility in RRC_CONNECTED is network-based as the network has the best information regarding the current situation such as load conditions, resources in different nodes, available frequencies, etc. The network can also take into account the situation of many UEs in the network, for a resource allocation perspective. The network prepares a target cell before the UE accesses that cell. The source cell provides the UE with the RRC configuration to be used in the target cell, including SRB1 configuration to send handover (HO) complete. The UE is provided by the target cell with a target C-RNTI i.e. target identifies UE from Message 3 (MSG.3) on the Medium Access Control (MAC) level for the HO complete message. Hence, there is no context fetching, unless a failure occurs. To speed up the handover, the network provides needed information on how to access the target, e.g. Random Access Channel (RACH) configuration, so the UE does not have to acquire System Information (SI) prior to the handover. The UE may be provided with contention-free random access (CFRA) resources, i.e. in that case the target cell identifies the UE from the preamble (MSG.1). The principle behind this is that the procedure can always be optimized with dedicated resources. In conditional handover (CHO), that might be a bit tricky as there is uncertainty about the final target but also the timing. Security is prepared before the UE accesses the target cell i.e. Keys must be refreshed before sending RRC Connection Reconfiguration Complete message, based on new keys and encrypted and integrity protected so the UE can be verified in the target cell. Both full and delta reconfiguration are supported so that the HO command can be minimized.

Mobility will be enhanced in LTE and NR in 3GPP in release 16. The main objectives are to improve the robustness at handover and to decrease the interruption time at handover.

One problem related to robustness at handover is that the handover (HO) Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

In LTE and NR, there may be different solutions to increase mobility robustness. One solution is called "conditional handover" or "early handover command". In order to avoid the undesired dependence on the serving radio link upon the time (and radio conditions) where the UE should execute the handover, the possibility to provide RRC signaling for the handover to the UE earlier should be provided.

To achieve this, it should be possible to associate the HO command with a condition e.g. based on radio conditions possibly similar to the ones associated to an A3 event, where a given neighbour becomes X db better than target. As soon as the condition is fulfilled, the UE executes the handover in accordance with the provided handover command.

Such a condition could e.g. be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

Figure 9:
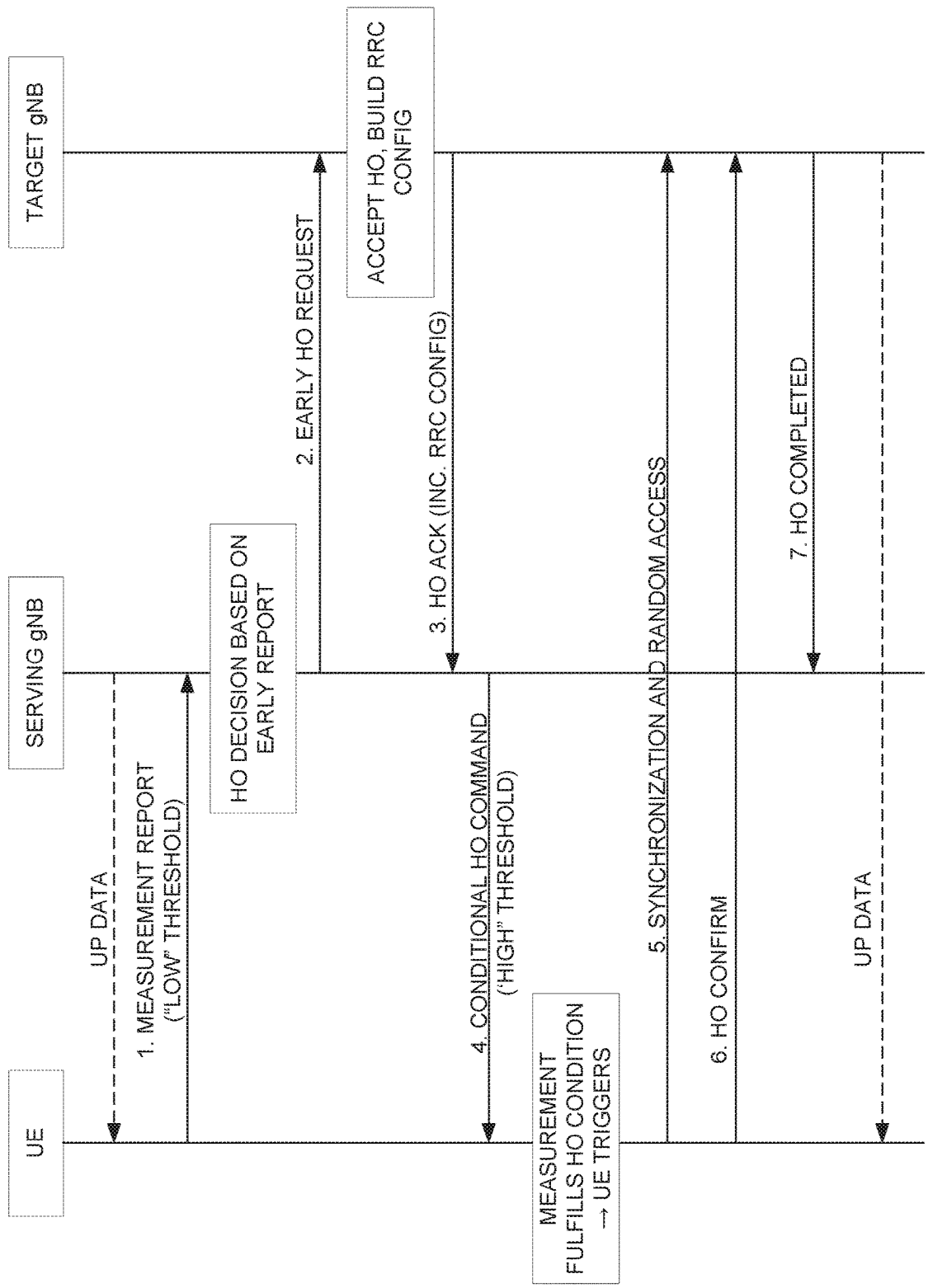
FIG. 9 is a call flow diagram of a conditional handover procedure according to some embodiments.

FIG. 9 depicts an example with just a serving cell and a target cell. In practice there may often be many cells or beams that the UE reported as possible candidates based on its preceding radio resource management (RRM) measurements. The network should then have the freedom to issue conditional handover commands for several of those candidates. The RRCConnectionReconfiguration for each of those candidates may differ, e.g. in terms of the HO execution condition (reference signal, RS, to measure and threshold to exceed) as well as in terms of the random access (RA) preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

More particularly, in FIG. 9, the serving gNB may exchange user plane (UP) data with the UE. In step 1, the UE sends a measurement report with a "low" threshold to the serving gNB. The serving gNB makes a handover (HO) decision based on this early report. In step 2, the serving gNB sends an early HO request to a target gNB. The target gNB accepts the HO request and builds an RRC configuration. The target gNB returns a HO acknowledgement, including the RRC configuration, to the serving gNB in step 3. In step 4, a conditional HO command with a "high" threshold is sent to the UE. Subsequently, measurements by the UE may fulfil the HO condition of the conditional HO command. The UE thus triggers the pending conditional handover. The UE performs synchronization and random access with the target gNB in step 5, and HO confirm is exchanged in step 6. In step 7, the target gNB informs the serving gNB that HO is completed. The target gNB may then exchange user plane (UP) data with the UE.

Figure 10:
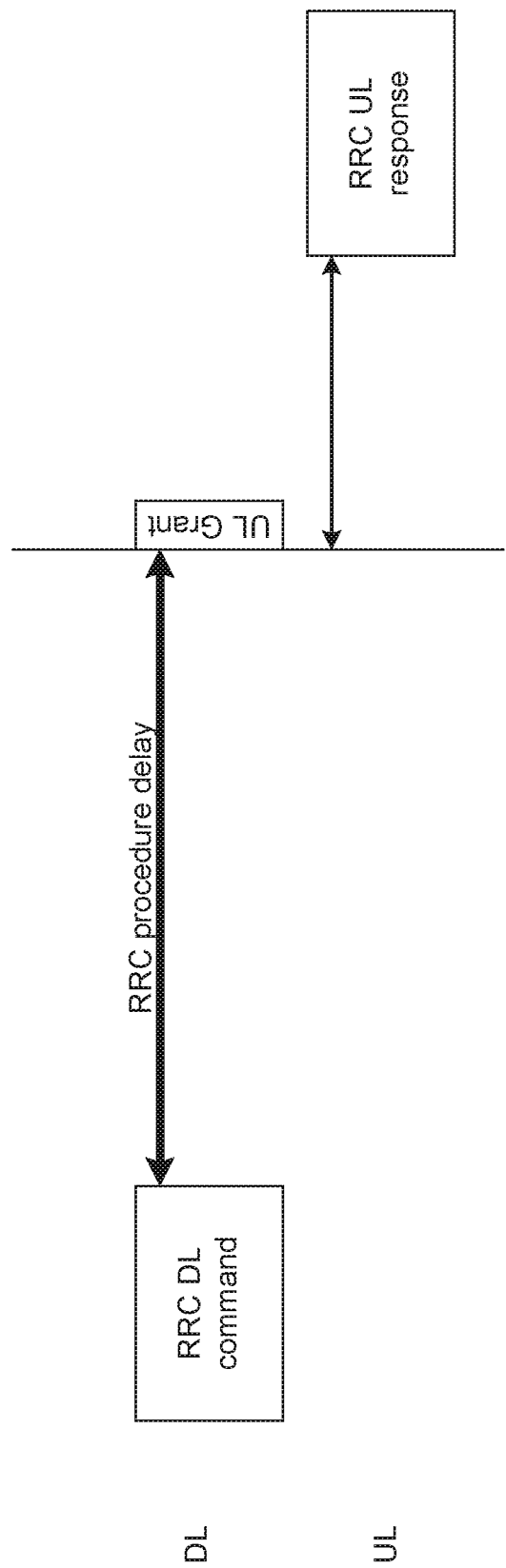
FIG. 10 is a block diagram showing a maximum RRC procedure delay according to some embodiments.

Consider now RRC message processing. When the UE receives an RRC message it needs some time to process the message. This is, in NR, described in section 12 of 3GPP TS 38.331 v15.4.0. In this section, it is defined the maximum processing time the UE is allowed to take depending on what the RRC message contains. For most of the messages, the maximum processing time is on the order of 10-20 ms. The UE shall, after the maximum processing time, be ready to receive an uplink grant which the UE will use to transmit an acknowledgement saying that the UE has processed the RRC configuration. It is shown in FIG. 10 (see section 12 of 3GPP TS 38.331 v15.4.0) where the UE receives an RRC DL command and then there is an RRC procedure delay after which the UE should be able to receive an UL grant in which the RRC UL response (associated with the RRC DL command) is sent.

There currently exists certain challenge(s). With conditional handover, the network can send an RRC message to the UE with a set of RRC configurations (one for each target). Based on current specifications, the UE would respond to the network to such an RRC message after at most a certain maximum processing time, which is on the order of 10 ms. However, the RRC message could in case of conditional handover contain many RRC configurations; hence the UE may not meet the processing delay requirements.

Certain aspects of the present disclosure and their embodiments may provide solutions to these or other challenges. In one set of embodiments, the UE applies a maximum allowed processing time which is a function of the number of targets included in the RRC message which is comprising a conditional handover command.

In another set of embodiments, the UE processes the conditions associated with conditional handovers upon reception of the conditional handover command, which should be possible to do quickly. But the configurations associated with the conditional handovers are processed later. Alternatively, the UE only processes the configuration associated with a target which has fulfilled the conditions for triggering the conditional handover.

Certain embodiments may provide one or more of the following technical advantage(s). The UE can meet the required maximum RRC processing times for conditional handover scenarios.

In more detail, a UE configured with a set of conditional RRCReconfiguration(s) shall execute a handover (or conditional handover, depending how the procedure is going to be called in NR RRC specifications) when the condition for the handover is fulfilled. As used herein, the term conditional handover related configuration(s) may be for a cell, list of cell(s), measurement object(s) or frequencies. In the case of the cell association, they may be for the same radio access technology (RAT) or for a different RAT.

The term "conditional handover related configuration(s)" for a cell may comprise the following:

An RRCReconfiguration like message (or any message with equivalent content), possibly containing a reconfigurationWithSync using NR terminology (defined in 38.331 specifications) and prepared by target candidates. Or, using the E-UTRA terminology, an RRCConnectionReconfiguration with mobilityControlInfo (defined in 36.331 specifications);

Triggering condition(s) configuration e.g. something like A1-A6 or B1-B2 (inter-RAT events) triggering events (as defined in 38.331/36.331 in reportConfig) where instead of triggering a measurement report it would trigger a conditional handover;

Other (optionally) conditional handover controlling parameters e.g. timer defining the validity of target candidate resources, etc.

Note that the term handover or reconfiguration with sync may be used herein with a similar meaning. Hence, a conditional handover may also be called a conditional reconfiguration with sync. In NR terminology, the handovers are typically called an RRCReconfiguration with a reconfigurationWthSync (field containing configuration necessary to execute a handover, like target information such as frequency, cell identifier, random access configuration, etc.). In E-UTRA terminology, the handovers are typically called an RRCConnectionReconfiguration with a mobilityControlInfo (field containing configuration necessary to execute a handover).

Most of the UE (and network) actions defined herein and network configurations are described as being performed in NR or E-UTRA. In other words, the configuration of a conditional HO received in NR for NR cells, and the UE may fail while monitoring these conditions and possibly try to re-connect after selecting an NR cell (e.g. via re-establishment).

However, embodiments herein are also applicable when any of these steps occurs in different RATs, for example:

UE is configured with a conditional HO in E-UTRA (for candidate NR and E-UTRA cells), UE fails in E-UTRA, but UE re-connects in E-UTRA;

UE is configured with a conditional HO in NR (for candidate NR and LTE cells), UE fails in NR, but UE re-connects in E-UTRA;

UE is configured with a conditional HO in E-UTRA (for candidate NR and E-UTRA cells), UE fails in E-UTRA, but UE re-connects in NR;

Or, in more general terms, UE is configured with a conditional HO in RAT-1 for cells in RAT-1 or RAT-2, the UE fails in RAT-1, but the UE re-connects in RAT-2.

It should be noted that herein it will be described scenarios where the UE gets conditional handover (CHO) commands towards multiple targets. This can be seen as the UE gets multiple CHOs, each CHO command having an associated target. Or it may be seen as the UE gets one CHO command where this (single) CHO command has multiple entries/parts, one entry/part per target.

Consider now embodiments in which the UE processes conditions and configurations upon reception. In one embodiment the UE will, upon reception of a conditional handover command, process both the condition(s) and the target cell configuration associated with the CHO command.

This embodiment has the benefit that the UE will process the whole message for CHO configuration as soon as possible and hence can determine if there is some error, or some part of the configuration which the UE cannot comply with.

In one case, the UE receives a CHO command containing a number K targets, which may be seen as the UE receives K CHO commands. The UE may in this case apply a maximum allowed processing time (T_max_processing) which is larger the larger the number K is. One possible implementation of this is that T_max_processing is linearly increasing with the number K. Some example formulas which could be applied for determining the maximum allowed processing time are shown below. The parameters A and B may for example be specified in a 3GPP specification.

Maximum allowed processing time=$A*K$
Maximum allowed processing time=$A*K+B$
Maximum allowed processing time=$A*(K-1)+B$ Below is one example implementation showing how the embodiment with the maximum processing time could be implemented in the RRC specification (3GPP TS 38.331). The addition is added with underlined text.

If this embodiment is applied by the UE, the gNB could determine the maximum processing time used by the UE, e.g. 30 ms in case three targets are added, and based on this decide when to send a grant to the UE so that the UE may respond with the acknowledgement message indicating the that UE has completed the RRC procedure (of adding the CHO commands in this case).

Beginning of Example Implementation

Processing Delay Requirements for RRC Procedures

The UE performance requirements for RRC procedures are specified in the following tables. The performance requirement is expressed as the time in [ms] from the end of reception of the network→UE message on the UE physical layer up to when the UE shall be ready for the reception of uplink grant for the UE→network response message with no access delay other than the TTI-alignment (e.g. excluding delays caused by scheduling, the random access procedure or physical layer synchronisation). In case the RRC procedure triggers BWP switching, the RRC procedure delay is the value defined in the following table plus the BWP switching delay defined in TS 38.133 [14], clause 8.6.3.

TABLE 12.1-1

UE performance requirements for RRC procedures for UEs

| Procedure title: | Network -> UE | UE -> Network | Value [ms] | Notes |
| --- | --- | --- | --- | --- |
| RRC Connection Control Procedures | | | | |
| RRC reconfiguration | RRCReconfiguration | RRCReconfiguration Complete | 10 | |
| RRC reconfiguration (CHO addition) | RRCReconfiguration | RRCReconfiguration Complete | 10*K | K = the number of added CHO targets |
| RRC reconfiguration (scell addition/release) | RRCRecon figuration | RRCReconfiguration Complete | 16 | |
| RRC reconfiguration (SCG establishment/ modification/ release) | RRCRecon figuration | RRCReconfiguration Complete | 16 | |
| RRC setup | RRCSetup | RRCSetupComplete | 10 | |
| RRC Release | RRCRelease | | NA | |
| RRC re-establishment | RRCReestablishment | RRCReestablishment Complete | 10 | |
| RRC resume | RRCResume | RRCResumeComplete | 6 or 10 | N = 6 applies for a UE supporting reduced CP |

TABLE 12.1-1-continued

UE performance requirements for RRC procedures for UEs

| Procedure title: | Network -> UE | UE -> Network | Value [ms] | Notes |
|---|---|---|---|---|
| | | | | latency for the case of RRCResume message only including MAC and PHY configuration, and no DRX, SPS, configured grant, CA or MIMO re-configuration will be triggered by this message. Further, the UL grant for transmission of RRC ResumeComplete and the data is transmitted over common search space with DCI format 0_0. In this scenario, the RRC procedure delay can extend beyond the reception of the UL grant, up to 7 ms. For other cases, N = 10 applies. |
| RRC resume (scell addition/release) | RRCResume | RRCResumeComplete | 16 | |
| Initial AS security activation | SecurityMode Command | SecurityModeComplete/ SecurityModeFailure | 5 | |
| Other procedures | | | | |
| UE assistance information | | UEAssistanceInformation | NA | |
| UE capability transfer | UECapabilityEnquiry | UECapabilityInformation | FFS | |
| Counter check | CounterCheck | CounterCheckResponse | 5 | |

End of Example Implementation

It should be noted that the UE may be faster than the maximum allowed processing time.

Consider now another embodiment in which the UE processes the conditions, but waits to process the configurations. In this embodiment, the UE will, upon reception of a conditional handover command, process only the condition(s) associated with the CHO command. However, the configuration associated with the CHO command is not processed upon reception of the CHO command. Rather the configuration associated with the CHO command may be processed upon:
  a) fulfillment of the condition associated with a CHO command, or
  b) start of a time-to-trigger (TTT) associated with a CHO command, or
  c) execution of the CHO (similar point in time as a)), or
  d) while monitoring the conditions for CHO, with a defined maximum time (starting at reception of the CHO configuration message), or
  e) while monitoring the conditions for CHO, with a later, but defined starting point, e.g. sending of an RRCReconfigurationComplete message related to the triggering conditions and a defined maximum time.

It should be noted that the times listed above (i.e. the times when the configuration associated with the CHO is processed) may in some cases coincide with the time of reception of the CHO. For example, if the UE receives multiple CHOs and the conditions associated to more than one CHO are already fulfilled upon reception of the CHOs.

This embodiment has the benefit that the UE will not process a configuration in a CHO command unless the UE shall apply it. For example, if the UE receives three CHO commands with three targets (each having an associated condition and configuration), and the conditions for one of them becomes fulfilled then the UE will process the configuration associated with the fulfilled CHO, but not the other two. Or in case none of the conditions for any of the CHOs becomes fulfilled, the UE does not need to process any of the configurations. It reduces the amount of processing in the UE. And since according to this embodiment the UE only processes the conditions associated with the CHOs upon reception of the CHOs, the processing delay for the CHO is shorter, compared to the case when the UE needs to process both the conditions and the configurations in the CHO commands.

Some of the embodiments are related to RRC procedures. RRC can be implemented in a could environment hence some aspects herein can be implemented in a cloud environment.

Figure 11:
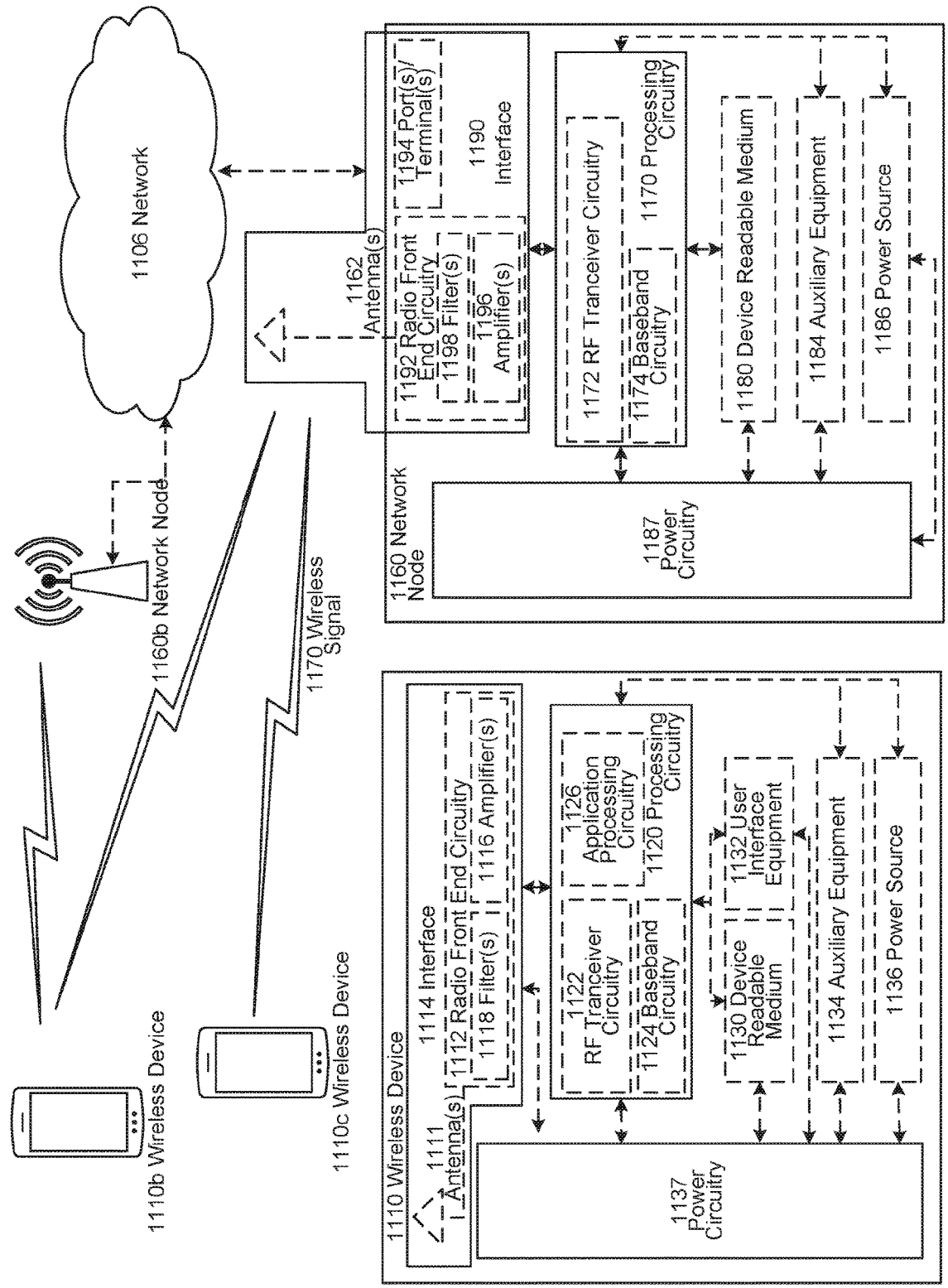
FIG. 11 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
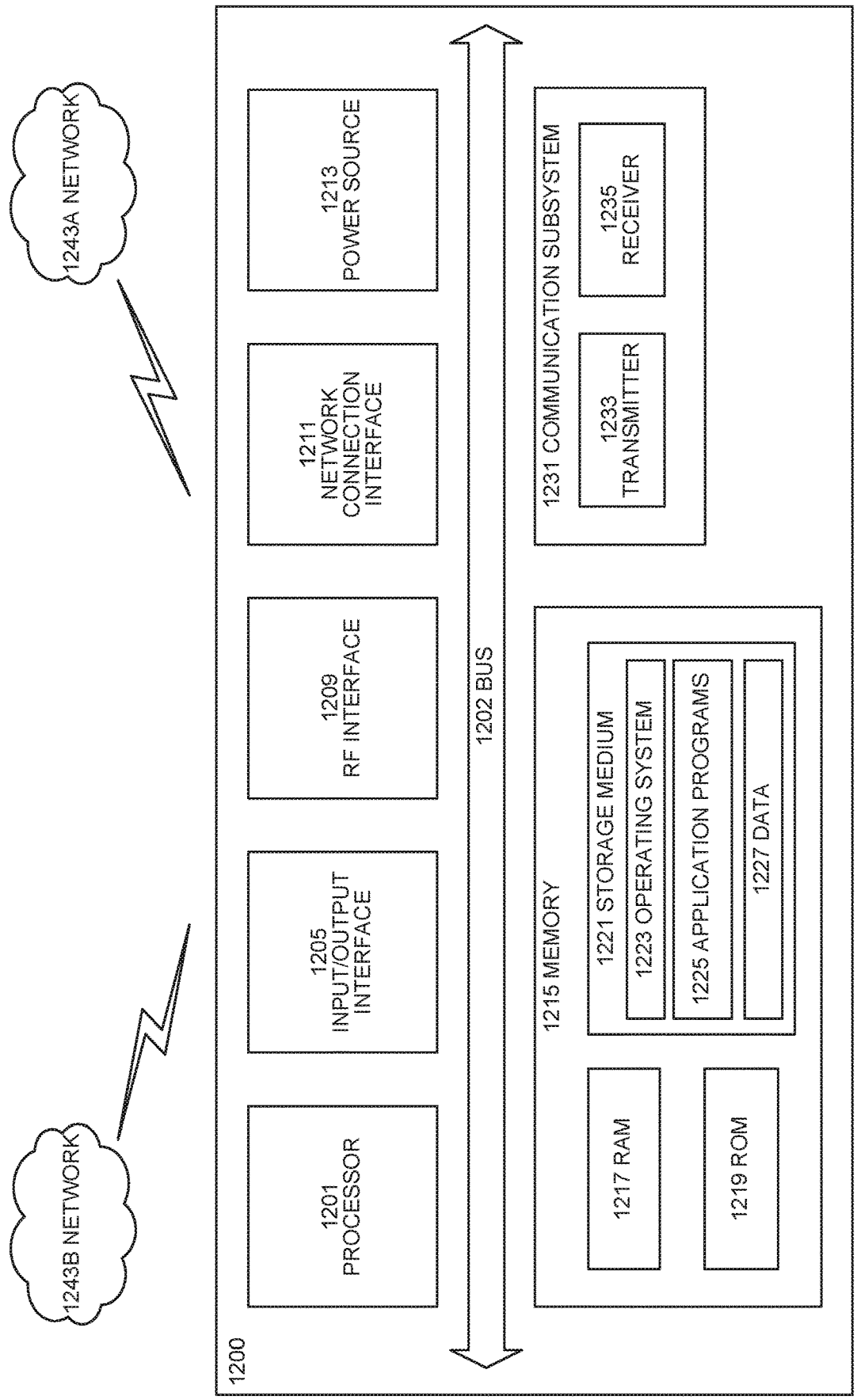
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
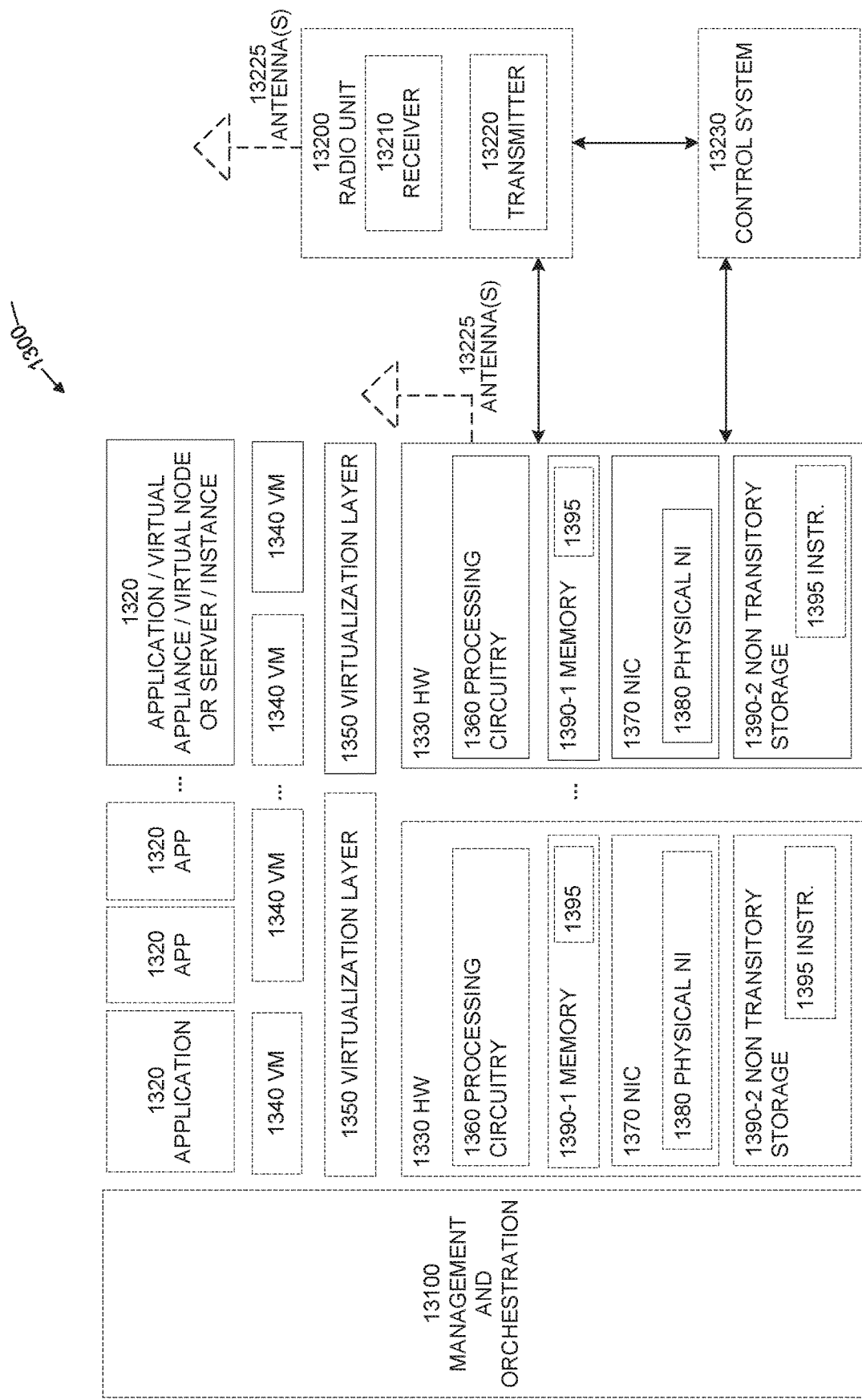
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
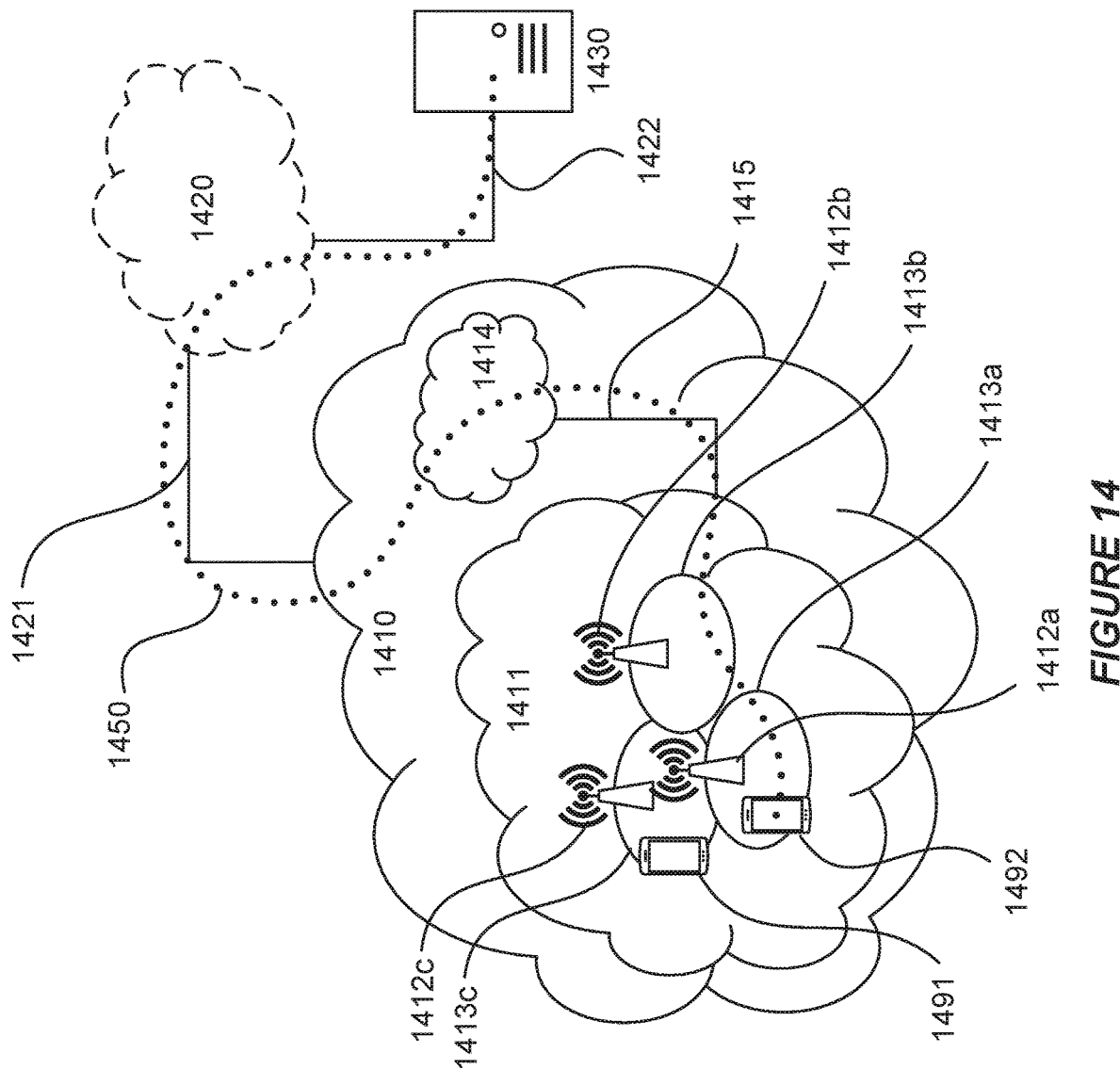
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
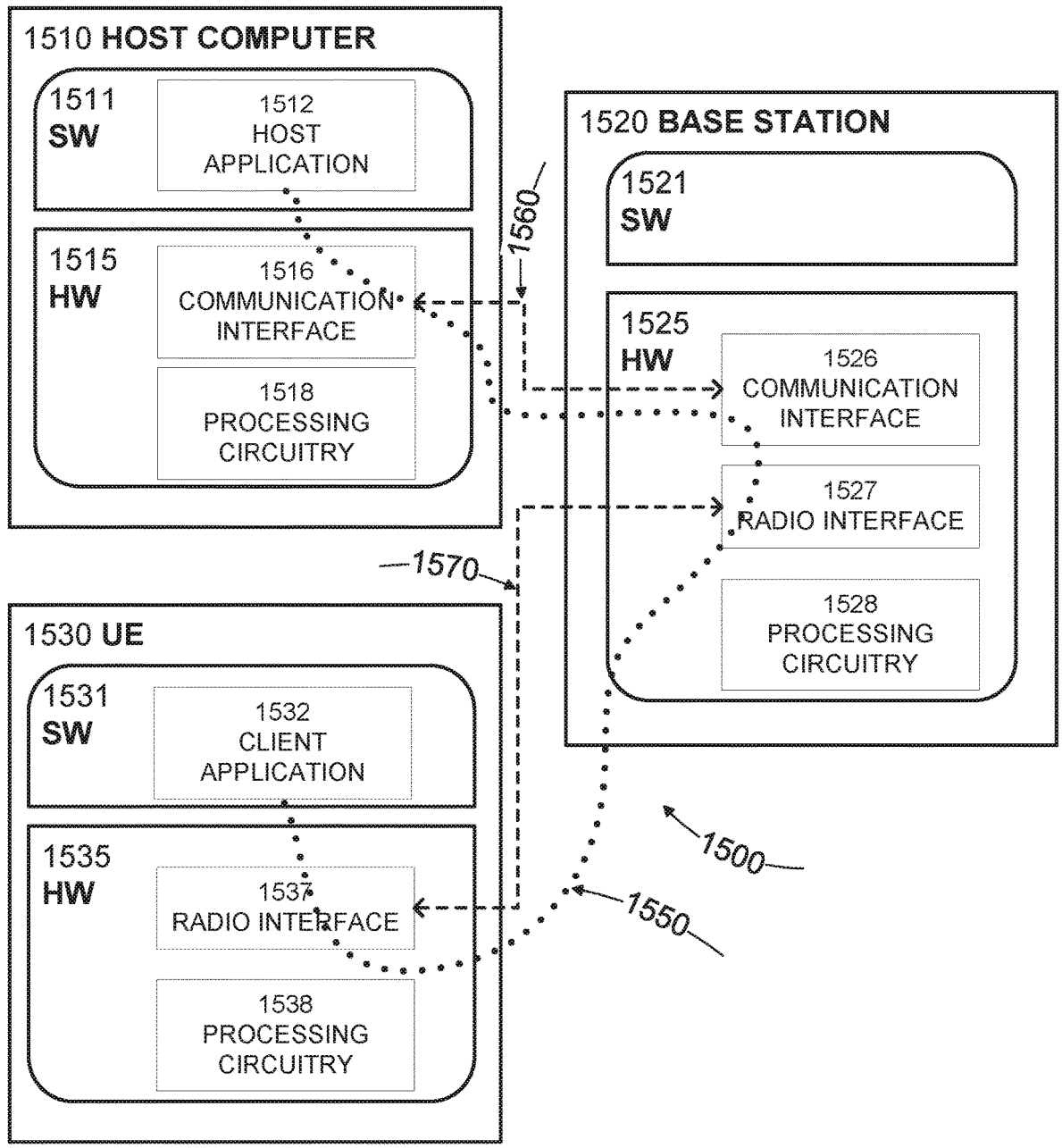
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve uplink grant scheduling and/or device processing delay and thereby provide benefits such as better responsiveness.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
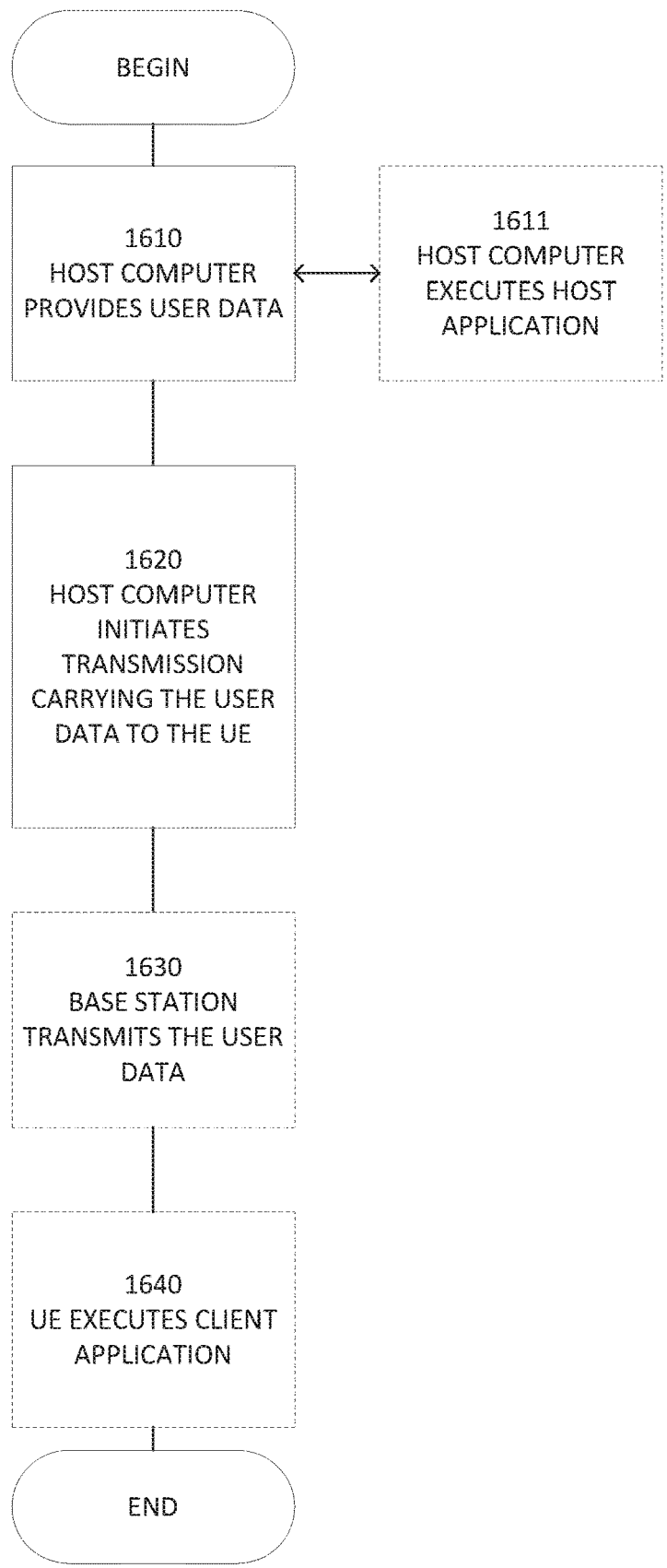
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
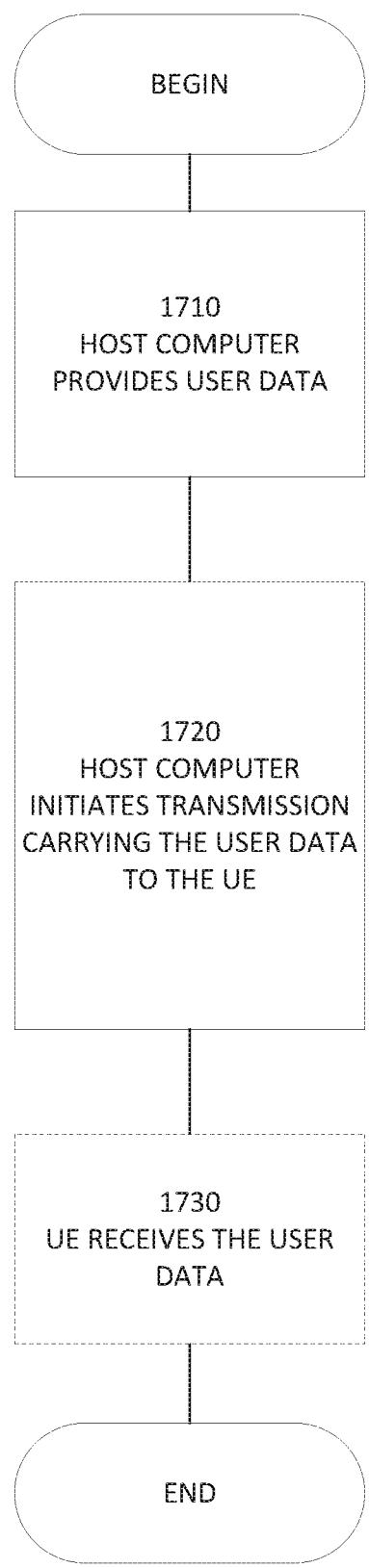
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
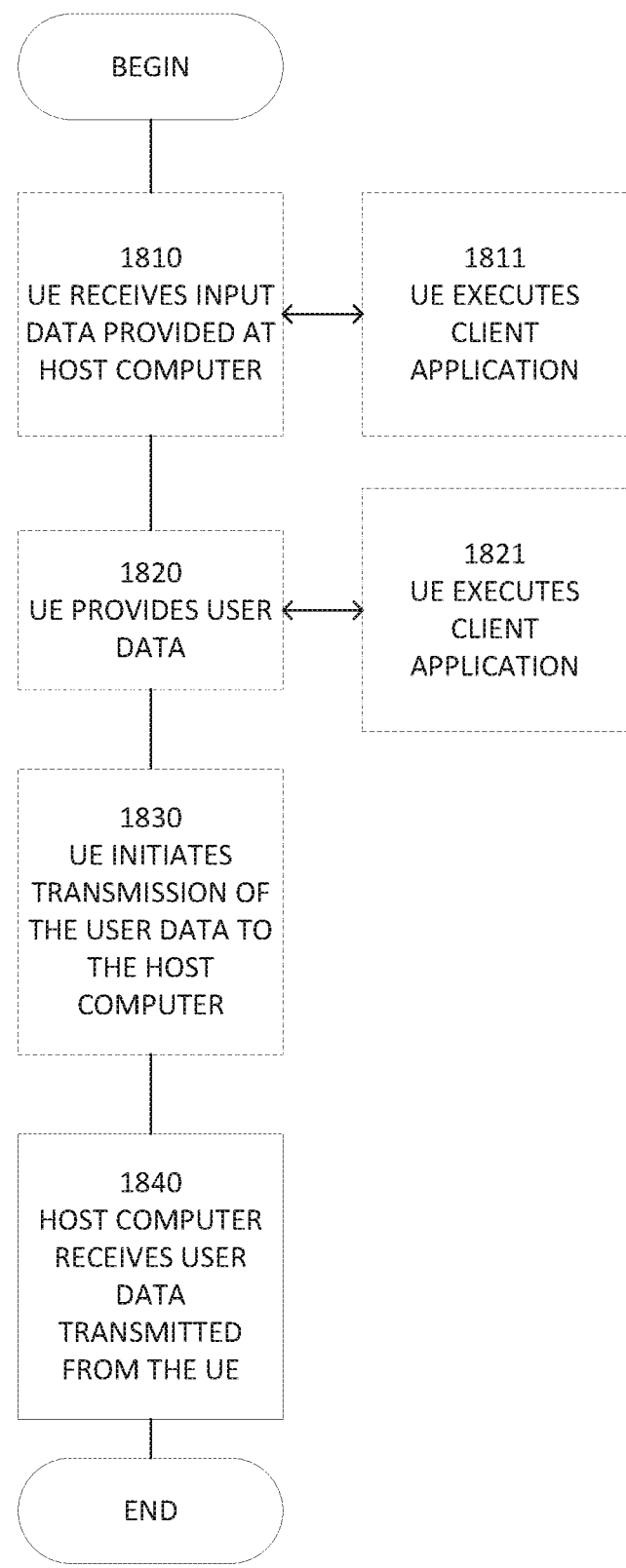
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
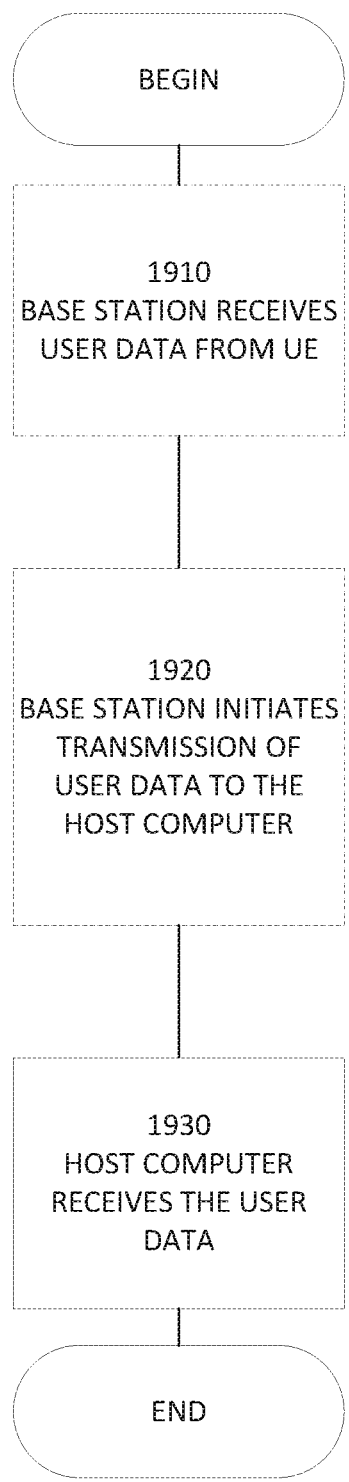
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

A1. A method performed by a wireless device, the method comprising:
- receiving, from a radio network node, a message that includes multiple conditional mobility configurations; and
- processing the message within a maximum allowed delay that is a function of a number of the conditional mobility configurations.

A2. The method of embodiment A1, wherein said processing is started upon receiving all or at least a part of the message.

A3. The method of any of embodiments A1-A2, wherein said processing comprises processing all of the message.

A4. The method of any of embodiments A1-A3, wherein said processing includes, for each of the conditional mobility configurations, determining whether the wireless device is able to comply with the conditional mobility configuration.

A5. The method of any of embodiments A1-A4, wherein, according to the function, the maximum allowed delay increases as the number of the conditional mobility configuration increases.

A6. The method of any of embodiments A1-A5, wherein, according to the function, the maximum allowed delay linearly increases as the number of the conditional mobility configuration increases.

A7. The method of any of embodiments A1-A6, wherein, according to the function, the maximum allowed delay is equal to A*K, wherein A is an integer number of time units and K is the number of conditional mobility configurations included in the message.

A8. The method of any of embodiments A1-A6, wherein, according to the function, the maximum allowed delay is equal to A*K+B, wherein A is an integer number of time units, B is also an integer number of time units, and K is the number of conditional mobility configurations included in the message.

A9. The method of any of embodiments A1-A6, wherein, according to the function, the maximum allowed delay is equal to A*(K−1)+B, wherein A is an integer number of time units, B is also an integer number of time units, and K is the number of conditional mobility configurations included in the message.

A10. The method of any of embodiments A1-A9, wherein the maximum allowed delay is expressed as a time from an end of reception of the message at a physical layer of the wireless device to when the wireless device shall be ready for reception of an uplink grant for a response message that the wireless device is to transmit to the radio network node.

A11. The method of any of embodiments A1-A10, wherein the message is a radio resource control, RRC, message.

A12. The method of any of embodiments A1-A11, wherein the message is a radio resource control, RRC, reconfiguration message.

A13. The method of any of embodiments A1-A12, wherein the conditional mobility configurations are conditional handover configurations.

A14. The method of any of embodiments A1-A13, wherein the wireless device is to apply the conditional mobility configurations when the wireless device detects fulfillment of respective conditions, wherein the message also includes one or more condition monitoring configurations that configure the wireless device to monitor the conditions, and wherein said processing comprises processing the one or more condition monitoring configurations as well as the conditional mobility configurations.

A15. The method of any of embodiments A1-A14, further comprising:
- after the maximum allowed delay has passed since reception of the message, receiving an uplink grant from the radio network node; and
- transmitting, to the radio network node, a response message based on the uplink grant.

A16. A method performed by a wireless device, the method comprising:
- receiving, from a radio network node, a message that includes multiple conditional mobility configurations; and
- after a maximum allowed delay has passed since reception of the message, receiving an uplink grant from the radio network node, wherein the maximum allowed delay is a function of a number of the conditional mobility configurations.

A17. The method of embodiments A16, wherein, according to the function, the maximum allowed delay increases as the number of the conditional mobility configuration increases.

A18. The method of any of embodiments A16-A17, wherein, according to the function, the maximum allowed delay linearly increases as the number of the conditional mobility configuration increases.

A19. The method of any of embodiments A16-A18, wherein, according to the function, the maximum allowed delay is equal to A*K, wherein A is an integer number of time units and K is the number of conditional mobility configurations included in the message.

A20. The method of any of embodiments A16-A18, wherein, according to the function, the maximum allowed delay is equal to A*K+B, wherein A is an integer number of time units, B is also an integer number of time units, and K is the number of conditional mobility configurations included in the message.

A21. The method of any of embodiments A16-A18, wherein, according to the function, the maximum allowed delay is equal to A*(K−1)+B, wherein A is an integer number of time units, B is also an integer number of time units, and K is the number of conditional mobility configurations included in the message.

A22. The method of any of embodiments A16-A21, wherein the maximum allowed delay is expressed as a time from an end of reception of the message at a physical layer of the wireless device to when the wireless device shall be ready for reception of the uplink grant.

A23. The method of any of embodiments A16-A22, wherein the message is a radio resource control, RRC, message.

A24. The method of any of embodiments A16-A23, wherein the message is a radio resource control, RRC, reconfiguration message.

A25. The method of any of embodiments A16-A23, wherein the conditional mobility configurations are conditional handover configurations.

A26. The method of any of embodiments A16-A25, further comprising transmitting, to the radio network node, a response message based on the uplink grant.

AA. The method of any of the previous embodiments, further comprising:
- providing user data; and
- forwarding the user data to a host computer via the transmission to a base station.

Group B Embodiments

B1. A method performed by a radio network node, the method comprising:
  transmitting, from the radio network node to a wireless device, a message that includes multiple conditional mobility configurations; and
  after a maximum allowed delay that is a function of a number of the conditional mobility configurations, transmitting from the radio network node to the wireless device an uplink grant for a response to be transmitted by the wireless device as a response to the message.

B2. The method of embodiment B1, further comprising receiving the response from the wireless device.

B3. The method of any of embodiments B1-B2, wherein, according to the function, the maximum allowed delay increases as the number of the conditional mobility configuration increases.

B4. The method of any of embodiments B1-B3, wherein, according to the function, the maximum allowed delay linearly increases as the number of the conditional mobility configuration increases.

B5. The method of any of embodiments B1-B4, wherein, according to the function, the maximum allowed delay is equal to A*K, wherein A is an integer number of time units and K is the number of conditional mobility configurations included in the message.

B6. The method of any of embodiments B1-B4, wherein, according to the function, the maximum allowed delay is equal to A*K+B, wherein A is an integer number of time units, B is also an integer number of time units, and K is the number of conditional mobility configurations included in the message.

B7. The method of any of embodiments B1-B4, wherein, according to the function, the maximum allowed delay is equal to A*(K−1)+B, wherein A is an integer number of time units, B is also an integer number of time units, and K is the number of conditional mobility configurations included in the message.

B8. The method of any of embodiments B1-B7, wherein the maximum allowed delay is expressed as a time from an end of reception of the message at a physical layer of the wireless device to when the wireless device shall be ready for reception of the uplink grant.

B9. The method of any of embodiments B1-B8, wherein the message is a radio resource control, RRC, message.

B10. The method of any of embodiments B1-B9, wherein the message is a radio resource control, RRC, reconfiguration message.

B11. The method of any of embodiments B1-B10, wherein the conditional mobility configurations are conditional handover configurations.

BB. The method of any of the previous embodiments, further comprising:
  obtaining user data; and
  forwarding the user data to a host computer or a wireless device.

Group X Embodiments

X1. A method performed by a wireless device, the method comprising:
  receiving, from a radio network node, a message that includes, for each of multiple targets, a conditional mobility configuration; and
  processing the message within a maximum allowed delay that is a function of a number of the multiple targets.

X2. The method of embodiment X1, wherein said processing is started upon receiving all or at least a part of the message.

X3. The method of any of embodiments X1-X2, wherein said processing comprises processing all of the message.

X4. The method of any of embodiments X1-X3, wherein said processing includes, for each of the conditional mobility configurations, determining whether the wireless device is able to comply with the conditional mobility configuration.

X5. The method of any of embodiments X1-X4, wherein, according to the function, the maximum allowed delay increases as the number of the multiple targets increases.

X6. The method of any of embodiments X1-X5, wherein, according to the function, the maximum allowed delay linearly increases as the number of the multiple targets increases.

X7. The method of any of embodiments X1-X6, wherein, according to the function, the maximum allowed delay is equal to A*K, wherein A is an integer number of time units and K is the number of multiple targets.

X8. The method of any of embodiments X1-X6, wherein, according to the function, the maximum allowed delay is equal to A*K+B, wherein A is an integer number of time units, B is also an integer number of time units, and K is the number of multiple targets.

X9. The method of any of embodiments X1-X6, wherein, according to the function, the maximum allowed delay is equal to A*(K−1)+B, wherein A is an integer number of time units, B is also an integer number of time units, and K is the number of multiple targets.

X10. The method of any of embodiments X1-X9, wherein the maximum allowed delay is expressed as a time from an end of reception of the message at a physical layer of the wireless device to when the wireless device shall be ready for reception of an uplink grant for a response message that the wireless device is to transmit to the radio network node.

X11. The method of any of embodiments X1-X10, wherein the message is a radio resource control, RRC, message.

X12. The method of any of embodiments X1-X11, wherein the message is a radio resource control, RRC, reconfiguration message.

X13. The method of any of embodiments X1-X12, wherein the conditional mobility configurations are conditional handover configurations.

X14. The method of any of embodiments X1-X13, wherein the message indicates conditions under which the wireless device is to apply respective ones of the conditional mobility configurations, and wherein said processing comprises processing the conditions as well as the conditional mobility configurations.

X15. The method of any of embodiments X1-X14, further comprising:
  after the maximum allowed delay has passed since reception of the message, receiving an uplink grant from the radio network node; and
  transmitting, to the radio network node, a response message based on the uplink grant.

X16. A method performed by a wireless device, the method comprising:
  receiving, from a radio network node, a message that includes, for each of multiple targets, a conditional mobility configuration; and
  after a maximum allowed delay has passed since reception of the message, receiving an uplink grant from the radio network node, wherein the maximum allowed delay is a function of a number of the multiple targets.

X17. The method of embodiments X16, wherein, according to the function, the maximum allowed delay increases as the number of the multiple targets increases.

X18. The method of any of embodiments X16-X17, wherein, according to the function, the maximum allowed delay linearly increases as the number of the multiple targets increases.

X19. The method of any of embodiments X16-X17, wherein, according to the function, the maximum allowed delay is equal to $A*K$, wherein A is an integer number of time units and K is the number of multiple targets.

X20. The method of any of embodiments X16-X17, wherein, according to the function, the maximum allowed delay is equal to $A*K+B$, wherein A is an integer number of time units, B is also an integer number of time units, and K is the number of multiple targets.

X21. The method of any of embodiments X16-X17, wherein, according to the function, the maximum allowed delay is equal to $A*(K-1)+B$, wherein A is an integer number of time units, B is also an integer number of time units, and K is the number of multiple targets.

X22. The method of any of embodiments X16-X21, wherein the maximum allowed delay is expressed as a time from an end of reception of the message at a physical layer of the wireless device to when the wireless device shall be ready for reception of an uplink grant for a response message that the wireless device is to transmit to the radio network node.

X23. The method of any of embodiments X16-X22, wherein the message is a radio resource control, RRC, message.

X24. The method of any of embodiments X16-X23, wherein the message is a radio resource control, RRC, reconfiguration message.

X25. The method of any of embodiments X16-X24, wherein the conditional mobility configurations are conditional handover configurations.

X26. The method of any of embodiments X16-X25, further comprising transmitting, to the radio network node, a response message based on the uplink grant.

Group Y Embodiments

Y1. A method performed by a radio network node, the method comprising:
  transmitting, from the radio network node to a wireless device, a message that includes, for each of multiple targets, a conditional mobility configuration; and
  after a maximum allowed delay that is a function of a number of the multiple targets, transmitting from the radio network node to the wireless device an uplink grant for a response to be transmitted by the wireless device as a response to the message.

Y2. The method of embodiment Y1, further comprising receiving the response from the wireless device.

Y3. The method of any of embodiments Y1-Y2, wherein, according to the function, the maximum allowed delay increases as the number of the multiple targets increases.

Y4. The method of any of embodiments Y1-Y3, wherein, according to the function, the maximum allowed delay linearly increases as the number of the multiple targets increases.

Y5. The method of any of embodiments Y1-Y4, wherein, according to the function, the maximum allowed delay is equal to $A*K$, wherein A is an integer number of time units and K is the number of multiple targets included in the message.

Y6. The method of any of embodiments Y1-Y4, wherein, according to the function, the maximum allowed delay is equal to $A*K+B$, wherein A is an integer number of time units, B is also an integer number of time units, and K is the number of multiple targets included in the message.

Y7. The method of any of embodiments Y1-Y4, wherein, according to the function, the maximum allowed delay is equal to $A*(K-1)+B$, wherein A is an integer number of time units, B is also an integer number of time units, and K is the number of multiple targets included in the message.

Y8. The method of any of embodiments Y1-Y7, wherein the maximum allowed delay is expressed as a time from an end of reception of the message at a physical layer of the wireless device to when the wireless device shall be ready for reception of the uplink grant.

Y9. The method of any of embodiments Y1-Y8, wherein the message is a radio resource control, RRC, message.

Y10. The method of any of embodiments Y1-Y9, wherein the message is a radio resource control, RRC, reconfiguration message.

Y11. The method of any of embodiments Y1-Y10, wherein the conditional mobility configurations are conditional handover configurations.

Group M Embodiments

M1. A method performed by a wireless device, the method comprising:
  receiving, from a radio network node, a message that includes:
    a condition monitoring configuration which configures the wireless device to monitor a condition; and
    a conditional mobility configuration which the wireless device is to apply when the wireless device detects fulfillment of the condition; and
  processing the condition monitoring configuration upon receiving the message; and
  processing the conditional mobility configuration only if and when a processing precondition is met.

M2. The method of embodiment M1, wherein the processing precondition is met when the condition is fulfilled.

M3. The method of embodiment M1, wherein the processing precondition is met when a time-to-trigger associated with the conditional mobility configuration starts.

M4. The method of embodiment M1, wherein the processing precondition is met when a mobility procedure associated with the conditional mobility configuration is triggered or executed.

M5. The method of embodiment M1, wherein the processing precondition is met when the wireless device monitors, or begins to monitor, for fulfillment of the condition.

M6. The method of embodiment M1, wherein the processing precondition is met when the wireless device transmits a response to the message.

M7. The method of any of embodiments M1-M6, wherein the processing precondition is not receipt of the message but is able to be met when the wireless device receives the message.

M8. The method of any of embodiments M1-M7, further comprising:
  receiving an uplink grant from the radio network node; and
  transmitting, to the radio network node and based on the uplink grant, a response to the message.

M9. The method of embodiment M8, comprising processing the conditional mobility configuration after (but not responsive to) transmitting the response.

M10. The method of any of embodiments M8-M9, wherein the processing precondition is met after (but not responsive to) transmitting the response.

M11. The method of any of embodiments M1-M10, wherein processing the conditional mobility configuration includes determining whether the wireless device is able to comply with the conditional mobility configuration.

M12. The method of any of embodiments M1-M11, wherein the message is a radio resource control, RRC, message.

M13. The method of any of embodiments M1-M12, wherein the message is a radio resource control, RRC, reconfiguration message.

M14. The method of any of embodiments M1-M13, wherein the conditional mobility configuration is conditional handover configuration.

M15. The method of any of embodiments M1-M14, wherein the message includes multiple mobility configurations, and wherein the method comprises processing each of the conditional mobility configurations only if and when a respective processing precondition for that conditional mobility configuration is met.

M16. The method of any of embodiments M1-M15, wherein the wireless device is configured to process the message within a maximum allowed delay that is independent of a number of conditional mobility configurations included in the message.

Group C Embodiments

C1. A wireless device configured to perform any of the steps of any of the Group A, X, or M embodiments.

C2. A wireless device comprising processing circuitry configured to perform any of the steps of any of the Group A, X, or M embodiments.

C3. A wireless device comprising:
communication circuitry; and
processing circuitry configured to perform any of the steps of any of the Group A, X, or M embodiments.

C4. A wireless device comprising:
processing circuitry configured to perform any of the steps of any of the Group A, X, or M embodiments; and
power supply circuitry configured to supply power to the wireless device.

C5. A wireless device comprising:
processing circuitry and memory, the memory containing instructions executable by the processing circuitry whereby the wireless device is configured to perform any of the steps of any of the Group A, X, or M embodiments.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A, X, or M embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A, X, or M embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B or Y embodiments.

C10. A radio network node comprising processing circuitry configured to perform any of the steps of any of the Group B or Y embodiments.

C11. A radio network node comprising:
communication circuitry; and
processing circuitry configured to perform any of the steps of any of the Group B or Y embodiments.

C12. A radio network node comprising:
processing circuitry configured to perform any of the steps of any of the Group B or Y embodiments;
power supply circuitry configured to supply power to the radio network node.

C13. A radio network node comprising:
processing circuitry and memory, the memory containing instructions executable by the processing circuitry whereby the radio network node is configured to perform any of the steps of any of the Group B or Y embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B or Y embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B or Y embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B or Y embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A, X, or M embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A, X, or M embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A, X, or M embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A, X, or M embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B or Y embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A, X, or M embodiments.

D28. The method of the previous embodiment, further comprising at the base station, receiving the user data from the UE.

D29. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method performed by a wireless device, the method comprising:
receiving, from a radio network node, a message that includes:
a condition monitoring configuration which configures the wireless device to monitor a condition; and
a conditional mobility configuration which the wireless device is to apply when the wireless device detects fulfillment of the condition;
processing the condition monitoring configuration upon receiving the message;
receiving an uplink grant from the radio network node;
transmitting, to the radio network node and based on the uplink grant, a response to the message; and
processing the conditional mobility configuration subject to a processing precondition being met, wherein the processing precondition is met after, but not responsive to, transmitting the response.

2. The method of claim 1, wherein the wireless device is configured to process the message within a maximum allowed delay, and wherein processing of the conditional mobility configuration is subjected to the processing precondition being met in order for the wireless device to comply with the maximum allowed delay for processing the message.

3. The method of claim 2, wherein the maximum allowed delay is independent of a number of conditional mobility configurations included in the message.

4. The method of claim 1, wherein said processing the conditional mobility configuration comprises processing the conditional mobility configuration only if and when the processing precondition is met.

5. The method of claim 1, wherein the processing precondition is met when the condition is fulfilled or when a mobility procedure associated with the conditional mobility configuration is triggered or executed.

6. The method of claim 1, wherein the processing precondition is met:
when a time-to-trigger associated with the conditional mobility configuration starts; or
when the wireless device monitors, or begins to monitor, for fulfillment of the condition.

7. The method of claim 1, wherein processing the conditional mobility configuration includes determining whether the wireless device is able to comply with the conditional mobility configuration.

8. The method of claim 1, wherein the message includes multiple conditional mobility configurations, and wherein the method comprises processing each of the conditional mobility configurations only if and when a respective processing precondition for that conditional mobility configuration is met.

9. A wireless device comprising:
communication circuitry; and
processing circuitry configured to:
receive, from a radio network node, a message that includes:
a condition monitoring configuration which configures the wireless device to monitor a condition; and
a conditional mobility configuration which the wireless device is to apply when the wireless device detects fulfillment of the condition;
process the condition monitoring configuration upon receiving the message;
receive an uplink grant from the radio network node;
transmit, to the radio network node and based on the uplink grant, a response to the message; and
process the conditional mobility configuration subject to a processing precondition being met, wherein the processing precondition is met after, but not responsive to, transmitting the response.

10. The wireless device of claim 9, wherein the processing circuitry is configured to process the message within a maximum allowed delay, and to subject processing of the conditional mobility configuration to the processing precondition being met in order for the wireless device to comply with the maximum allowed delay for processing the message.

11. The wireless device of claim 10, wherein the maximum allowed delay is independent of a number of conditional mobility configurations included in the message.

12. The wireless device of claim 9, wherein the processing circuitry is configured to process the conditional mobility configuration only if and when the processing precondition is met.

13. The wireless device of claim 9, wherein the processing precondition is met when the condition is fulfilled or when a mobility procedure associated with the conditional mobility configuration is triggered or executed.

14. The wireless device of claim 9, wherein the processing precondition is met:
when a time-to-trigger associated with the conditional mobility configuration starts;
when the wireless device monitors, or begins to monitor, for fulfillment of the condition.

15. The wireless device of claim 9, wherein the processing circuitry is configured to determine whether the wireless device is able to comply with the conditional mobility configuration.

16. The wireless device of claim 9, wherein the message includes multiple conditional mobility configurations, and wherein the processing circuitry is configured to process each of the conditional mobility configurations only if and when a respective processing precondition for that conditional mobility configuration is met.

17. A non-transitory computer-readable storage medium on which is stored instructions that, when executed by a processor of a wireless device, causes the wireless device to:
receive, from a radio network node, a message that includes:
a condition monitoring configuration which configures the wireless device to monitor a condition; and
a conditional mobility configuration which the wireless device is to apply when the wireless device detects fulfillment of the condition;
process the condition monitoring configuration upon receiving the message;
receive an uplink grant from the radio network node;
transmit, to the radio network node and based on the uplink grant, a response to the message; and process the conditional mobility configuration subject to a processing precondition being met, wherein the processing precondition is met after, but not responsive to, transmitting the response.

18. The method of claim 1, wherein the response:
acknowledges the message;
indicates whether the wireless device is able to comply with all or some of the conditional mobility configurations; and/or
indicates whether the wireless device succeeded or failed in complying with or applying all or some of the conditional mobility configurations.

19. The wireless device of claim 9, wherein the response:
acknowledges the message;
indicates whether the wireless device is able to comply with all or some of the conditional mobility configurations; and/or
indicates whether the wireless device succeeded or failed in complying with or applying all or some of the conditional mobility configurations.

* * * * *